United States Patent
Shibai et al.

(10) Patent No.: US 12,331,184 B2
(45) Date of Patent: Jun. 17, 2025

(54) FILM

(71) Applicant: SHARP KABUSHIKI KAISHA, Osaka (JP)

(72) Inventors: Yasuhiro Shibai, Osaka (JP); Hidetsugu Kawai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 833 days.

(21) Appl. No.: 17/549,780

(22) Filed: Dec. 13, 2021

(65) Prior Publication Data
US 2022/0195173 A1    Jun. 23, 2022

(30) Foreign Application Priority Data

Dec. 21, 2020   (JP) .................................. 2020-211440

(51) Int. Cl.
*C08L 51/00*    (2006.01)

(52) U.S. Cl.
CPC .................................. *C08L 51/003* (2013.01)

(58) Field of Classification Search
CPC . C08L 51/003; C08J 2367/02; C08J 2433/02; C08J 7/0423; C08J 7/046; C08J 151/08; C08F 290/062; C08F 299/024; B01J 31/34; B01J 31/06; B01J 35/00; B01J 35/30; B01J 35/39; B01J 35/393; A01N 25/10; A01N 59/16
See application file for complete search history.

(56) References Cited

U.S. PATENT DOCUMENTS

| | | | |
|---|---|---|---|
| 10,934,405 B2 | 3/2021 | Shibai et al. | |
| 2007/0159698 A1 | 7/2007 | Taguchi et al. | |
| 2009/0194914 A1 | 8/2009 | Uozu et al. | |
| 2012/0318772 A1 | 12/2012 | Minoura et al. | |
| 2013/0194668 A1* | 8/2013 | Liang | C03C 17/3417 977/773 |
| 2013/0315786 A1 | 11/2013 | Horie | |
| 2015/0140154 A1 | 5/2015 | Isurugi et al. | |
| 2016/0113274 A1 | 4/2016 | Yamada et al. | |
| 2016/0299260 A1* | 10/2016 | Ibuki | G02B 1/118 |
| 2016/0326275 A1 | 11/2016 | Ashikaga et al. | |
| 2017/0258081 A1 | 9/2017 | Yamada et al. | |
| 2018/0171036 A1 | 6/2018 | Ashikaga et al. | |
| 2018/0194910 A1 | 7/2018 | Nakahara et al. | |
| 2019/0255759 A1* | 8/2019 | Yamada | B29C 59/16 |
| 2019/0284355 A1 | 9/2019 | Shibai et al. | |

FOREIGN PATENT DOCUMENTS

| | | |
|---|---|---|
| CN | 102159317 A | 8/2011 |
| CN | 110272518 A | 9/2019 |
| EP | 2343125 A1 | 7/2011 |

(Continued)

*Primary Examiner* — Jessica M Roswell
(74) *Attorney, Agent, or Firm* — ScienBiziP, P.C.

(57) ABSTRACT

The film according to an embodiment of the present invention 1 includes a synthetic polymer membrane 3 including a surface having a plurality of protrusions 3a, and photocatalyst particles 4 supported on the surface of the synthetic polymer membrane 3. As the synthetic polymer membrane 3 is seen from a normal line direction, the two-dimensional size of the plurality of protrusions 3a is more than 20 nm to less than 500 nm. The mean particle diameter of the photocatalyst particles 4 is preferably 20 nm or more to 1000 nm or less.

11 Claims, 8 Drawing Sheets

(56) References Cited

FOREIGN PATENT DOCUMENTS

| | | | |
|---|---|---|---|
| EP | 2343125 | B1 | 3/2019 |
| JP | 2009-166502 | A | 7/2009 |
| JP | 2010125357 | A | 6/2010 |
| JP | 2010284843 | A | 12/2010 |
| JP | 2016-093939 | A | 5/2016 |
| WO | 2008001847 | A1 | 1/2008 |
| WO | 2011/125486 | A1 | 10/2011 |
| WO | 2012105407 | A1 | 8/2012 |
| WO | 2013/183576 | A1 | 12/2013 |
| WO | 2015/163018 | A1 | 10/2015 |
| WO | 2016039129 | A1 | 3/2016 |
| WO | 2016/080245 | A1 | 5/2016 |
| WO | 2016/208540 | A1 | 12/2016 |

\* cited by examiner

FILM

BACKGROUND OF THE INVENTION

Field of the Invention

The present invention relates to a film.

Description of the Background Art

Recently, several findings have been reported that a nano surface structure in black silicon and wings of a cicada, a dragonfly, and the like has germicidal action. The reports describes that the physical structure of a nanopillar in black silicon, and wings of a cicada, a dragonfly, and the like exerts the germicidal action.

Thus several articles have been proposed which have a germicidal or antimicrobial property with use of such physical structure of the nanopillar. For example, an antimicrobial article has been proposed which includes a dense arrangement of multiple micro projections, and has on the surface, micro projection structure bodies with an average $d_{AVG}$ of distances d between the micro projections adjacent to each other of 30 nm-90 nm, and an average aspect ratio ($H_{AVG}/d_{AVG}$) defined as a ratio of the average $H_{AVG}$ of heights H of the micro projections to the average $d_{AVG}$ of distances d between the micro projections of 3.0-6.25 (Japanese Patent Application Laid-Open Publication No. 2016-093939).

However, black silicon has poor mass productivity even though its germicidal action is intended to be employed. Black silicon is also hard and fragile, and thus has low formability and abrasion resistance. In addition, the antimicrobial article described in Japanese Patent Application Laid-Open Publication No. 2016-093939 has a room for improvement in germicidal action. Furthermore, it is preferable that a member having germicidal action have deodorant action.

The present invention was made in view of the problems described above, and an object is to provide a film excellent in abrasion resistance, deodorant action, and germicidal action.

SUMMARY OF THE INVENTION

A film according to an embodiment of the present invention includes a synthetic polymer membrane including a surface having a plurality of protrusions, and photocatalyst particles supported on the surface of the synthetic polymer membrane. As the synthetic polymer membrane is seen from a normal line direction, the two-dimensional size of the plurality of protrusions is more than 20 nm to less than 500 nm.

The film in the present invention is excellent in abrasion resistance, deodorant action, and germicidal action.

DESCRIPTION OF THE PREFERRED EMBODIMENTS

Figure 1:
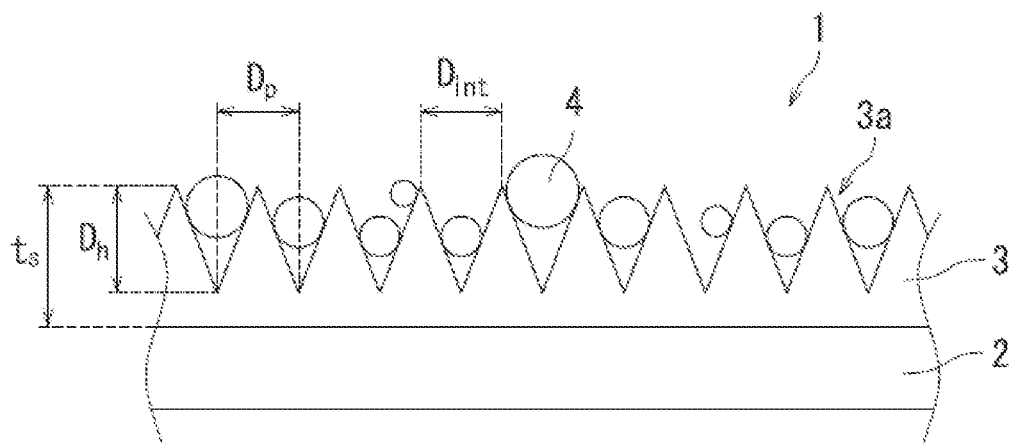
FIG. 1 shows an example of films according to an embodiment of the present invention.

Some embodiments of the present invention will now be described with reference to the drawings. Note that the present invention is not limited to the embodiments at all, and can be performed with appropriately adding change within an object of the present invention. Additionally, in the drawings, description for the same or corresponding part may be omitted with providing the same reference sign. Meanwhile, acrylic and methacrylic may be inclusively and generically referred to as "(meth)acrylic". Acrylate and methacrylate may also be inclusively and generically referred to as "(meth)acrylate". Each of materials described in the embodiments of the present invention may be used as a single type or in combination of two or more types unless otherwise stated.

In addition, the term "sterilization (microbicidal)" herein refers to reduction of the number of proliferative microorganisms contained in an object such as a material or liquid, or a limited space by an effective number. The term "microorganism" encompasses viruses, bacteria, and fungi. The term "antimicrobial" widely covers suppression and prevention of propagation of microorganisms, and includes suppression of darkening, slime, and the like due to microorganisms

Film

The film according to an embodiment of the present invention includes a synthetic polymer membrane including a surface having a plurality of protrusions, and photocatalyst particles supported on the surface of the synthetic polymer membrane. As the synthetic polymer membrane is seen from a normal line direction, the two-dimensional size of the plurality of protrusions is more than 20 nm to less than 500 nm. Hereinafter, a structure having a plurality of protrusions, where the two-dimensional size of the plurality of protrusions is more than 20 nm to less than 500 nm as seen from a normal line direction may be described as "moth eye structure". The film according to an embodiment of the present invention is excellent in abrasion resistance, deodorant action, and germicidal action, and can be preferably used as a member of a place touched by a person indoors. In particular, the film according to an embodiment of the present invention can be preferably used for a film or the like that coats a surface of a touch panel of an electronic instrument, a monitor, and an interactive whiteboard.

The Applicants developed a method of producing an anti-reflective membrane (anti-reflective surface) having a moth eye structure with use of an anodized porous alumina layer. Use of an anodized porous alumina layer allows production of a die having an inverted moth eye structure with high mass productivity.

The inventor achieved to develop a synthetic polymer membrane having a germicidal effect on the surface by applying the technology described above (see, e.g., WO2015/163018, WO2016/080245, and WO2016/208540). For reference, the disclosure in WO2015/163018, WO2016/080245, and WO2016/208540 described above is incorporated herein in its entirety.

The film according to an embodiment of the present invention is a film that is further developed from the synthetic polymer membrane having a germicidal effect on the surface described above. The film according to an embodiment of the present invention is excellent in abrasion resistance, deodorant action, and germicidal action by having the configuration described above. The reason will be described below. The film according to an embodiment of the present invention includes a synthetic polymer membrane having a moth eye structure, and a photocatalyst particle. The synthetic polymer membrane has a moth eye structure and thus certain germicidal action. Moreover, the photocatalyst particle has deodorant action and germicidal action. Accordingly, the film according to an embodiment of the present invention has excellent germicidal action caused by a moth eye structure and the photocatalyst particle, and deodorant action caused by the photocatalyst particle. The synthetic polymer membrane also has a moth eye structure, which is a complex structure of cavities and protrusions, and thus can support the photocatalyst particle firmly. Accordingly, the film according to an embodiment of the present invention is excellent in abrasion resistance, and the photocatalyst particle is not to be released easily even in rubbing of the surface of the synthetic polymer membrane side.

Here, examples of organic materials to be objects of deodorant action of the photocatalyst particle include volatile organic compounds (VOC), and more particularly, formaldehyde, acetaldehyde, and ammonia.

The two-dimensional size of the plurality of protrusions is more than 20 nm to less than 500 nm as described above, preferably 100 nm or more to 300 nm or less, and more preferably 150 nm or more to 250 nm or less. Providing a two-dimensional size of the plurality of protrusions of more than 20 nm enables suppression of release of the photocatalyst particle from the synthetic polymer membrane. Providing a two-dimensional size of the plurality of protrusions of less than 500 nm enables improvement in strength of the protrusion.

In the film according to an embodiment of the present invention, a contact angle to water on the surface of the synthetic polymer membrane side is preferably 40° or less, more preferably 30° or less, and even more preferably 20° or less. By providing the above-described contact angle to water of 40° or less, once a microorganism-containing liquid is adhered to the surface of the synthetic polymer membrane, the microorganism-containing liquid wets and spreads on the surface of the synthetic polymer membrane more easily, and permeates inside the moth eye structure of the synthetic polymer membrane more easily. Consequently, microorganisms contained in the liquid contacts the photocatalyst particle more easily. This provides more improved germicidal action of the film according to an embodiment of the present invention. Here, the contact angle to water described above is measured by the method described in the examples.

Referring to FIG. 1, description will be made for an example of structures of the film according to an embodiment of the present invention. FIG. 1 shows a schematic cross-sectional view of a film 1, which is an example of the films according to an embodiment of the present invention. The film 1 includes a base film 2, a synthetic polymer membrane 3 formed on the base film 2, and a photocatalyst particle 4 supported on the surface of the synthetic polymer membrane 3. The synthetic polymer membrane 3 included in the film 1 exemplified here is formed on the base film 2, but is not limited thereto of course. The synthetic polymer membrane 3 can be formed directly on a surface of any object. In other words, the base film 2 can be omitted in the film 1.

Base Film

As the base film 2, there is no particular limitation, and for example, a resin base film can be used. The thickness of the base film 2 is e.g., 20 μm or more to 1000 μm or less.

Synthetic Polymer Membrane

The synthetic polymer membrane 3 has a plurality of protrusions 3a on the surface. The plurality of protrusions 3a configures a moth eye structure. As seen from a normal line direction of the synthetic polymer membrane 3, the two-dimensional size $D_p$ of the protrusion 3a is in the range of more than 20 nm to less than 500 nm. Here, the term "two-dimensional size" in the protrusion 3a designates an area equivalent circle diameter of the protrusion 3a as seen from a normal line direction of the surface. For example, when the protrusion 3a has a conical shape, the two-dimensional size of the protrusion 3a corresponds to the diameter of the bottom face of the circular cone. Additionally, the adjacent distance $D_{int}$ of the protrusions 3a is typically more than 20 nm to 1000 nm or less. As illustrated in FIG. 1, the protrusions 3a are densely arranged; when there is no space between the protrusions 3a adjacent to each other (e.g., the bottom faces of the circular cones overlapped partially), the two-dimensional size $D_p$ of the protrusion 3a is equal to the adjacent distance $D_{int}$. The height $D_h$ of the protrusion 3a is typically 50 nm or more to less than 500 nm. As described later, even if the height $D_h$ of the protrusion 3a is 150 nm or less, germicidal action is exerted. The thickness is of the synthetic polymer membrane 3 is not particularly limited, and only need be larger than the height $D_h$ of the protrusion 3a.

Synthetic Polymer

The synthetic polymer membrane 3 contains synthetic polymer. Examples of the synthetic polymers include polyester resins, acrylic resins, urethane resins, polyimide resins, polyamide resins, polyolefin resins, and polystyrene resins. The synthetic polymer is preferably an acrylic resin. The content ratio of the synthetic polymer in the synthetic polymer membrane 3 is preferably 70% by mass or more, and more preferably 90% by mass or more.

The synthetic polymer membrane 3 preferably contains synthetic polymer having a cross-linking structure. The cross-linking structure preferably includes an ethylene oxide unit. Such configuration allows improvement in durability of the moth eye structure formed on the synthetic polymer membrane 3. Examples of the synthetic polymers having a cross-linking structure including an ethylene oxide unit include a synthetic polymer having a repeated unit derived from polyalkylene glycol di(meth) acrylate. Examples of the polyalkylene glycol di(meth)acrylate include polyethylene glycol diacrylate and polypropylene glycol diacrylate.

The synthetic polymer membrane 3 is e.g., a cured material of a curable resin composition that contains a monomer or an oligomer and a polymerization initiator (e.g., photopolymerization initiator). The curable resin composition is preferably a photocuring resin composition that contains a monomer or an oligomer and a photopolymerization initiator. When the synthetic polymer membrane 3 is a cured material of a photocuring resin composition, the film 1 can be easily produced in a roll-to-roll technique as described later.

Organic Carboxylic Acid

The synthetic polymer membrane 3 preferably contains an organic carboxylic acid. Examples of the organic carboxylic acids include acetic acid, butyric acid, lactic acid, trichloroacetic acid, trifluoroacetic acid, benzoic acid, alkyl benzoic acid (e.g., 2,4,6-trimethyl benzoic acid), suberic acid, sebacic acid, salicylic acid, oxalic acid, and succinic acid. The organic carboxylic acid is preferably 2,4,6-trimethyl benzoic acid or succinic acid.

In addition, some kinds of organic carboxylic acids have germicidal action (or antimicrobial action), and have been used as, e.g., a food preservative. An organic carboxylic acid is considered to exert germicidal action (antimicrobial action) through a variety of mechanisms. The mechanisms include (1) one caused by reduction of ambient pH, and (2) one caused by undissociated acid passing through a cell membrane and reducing intracellular pH. The mechanism (2) has a larger contribution in a weaker acid (having a smaller dissociation constant). See, e.g., Rosa M. Raybaudi-Massilia et al., "Control of Pathogenic and Spoilage Microorganisms in Fresh-cut Fruits and Fruit Juices by Traditional and Alternative Natural Antimicrobials", COMPREHENSIVE REVIEWS IN FOOD SCIENCE AND FOOD SAFETY, Vol. 8, pp. 157-180, 2009 (in particular, p. 162).

As described later with showing the examples, germicidal action of the film according to an embodiment of the present invention including a synthetic polymer membrane containing an organic carboxylic acid is considered to be improved through the mechanisms (1) and (2) described above.

Figure 2:
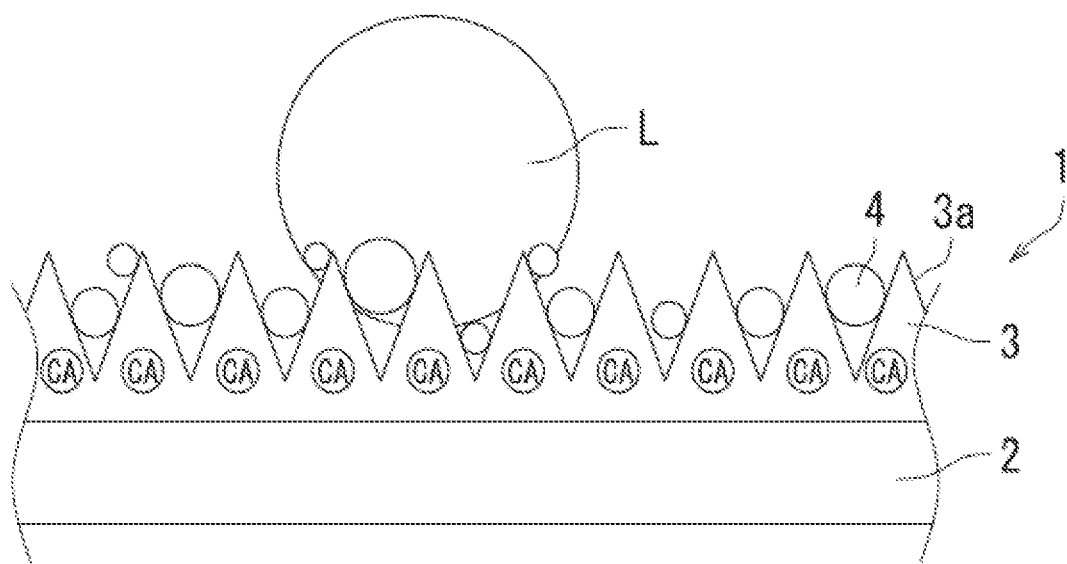
FIG. 2 illustrates germicidal action in the case of a synthetic polymer membrane that contains an organic carboxylic acid (CA) in FIG. 1.
Figure 3:
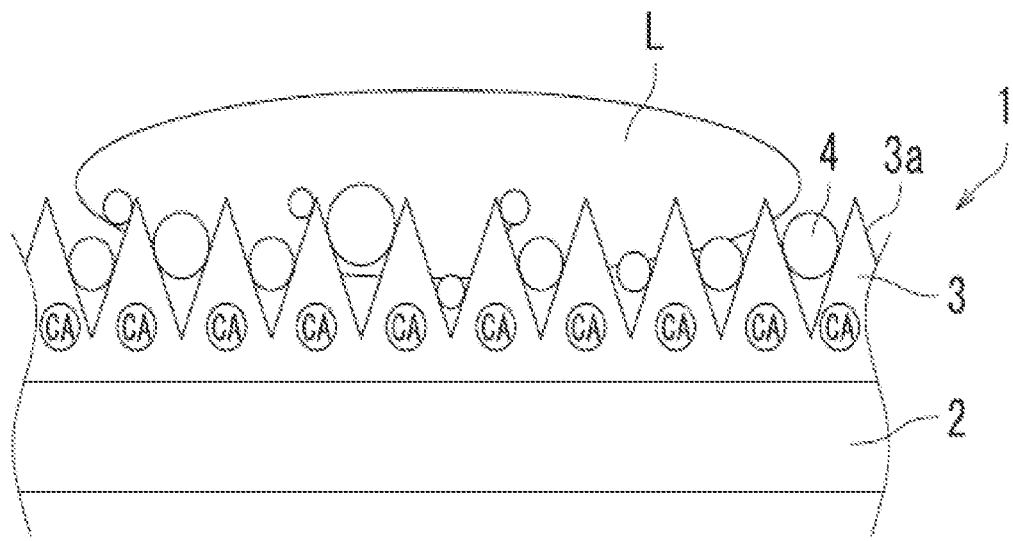
FIG. 3 shows a next step after FIG. 2.
Figure 4:
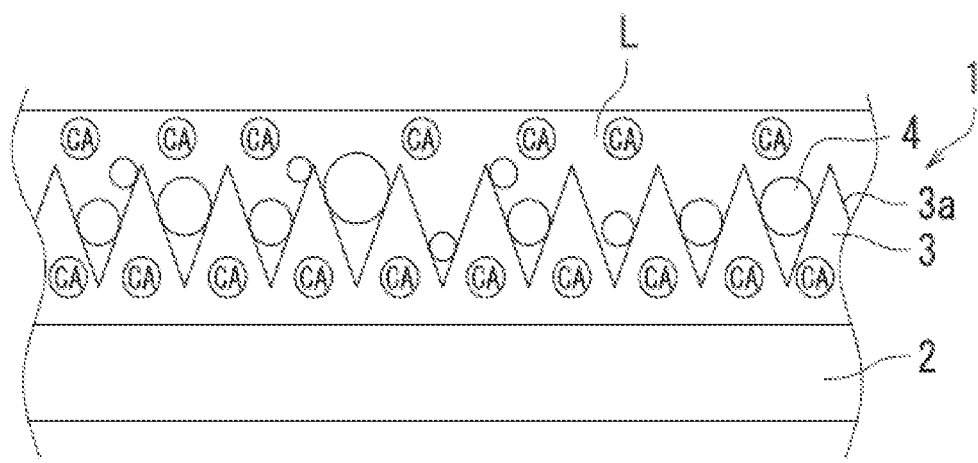
FIG. 4 shows a next step after FIG. 3.
Figure 5:
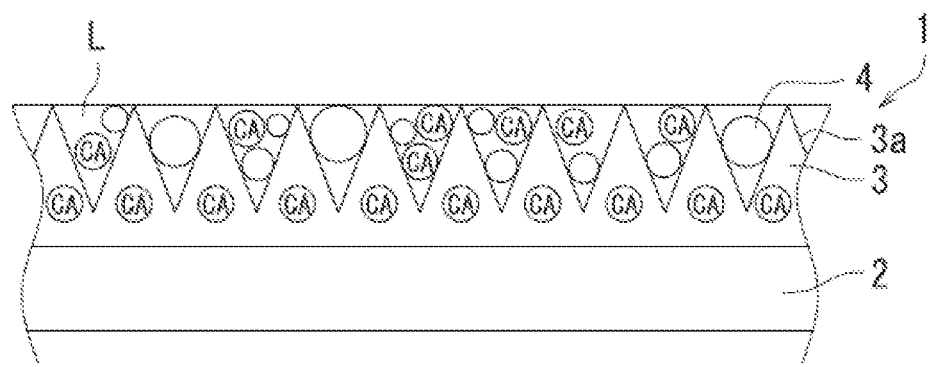
FIG. 5 shows a next step after FIG. 4.

Referring to FIGS. 2-5, description will be made for germicidal action in the case of the synthetic polymer membrane 3 that contains an organic carboxylic acid (CA). In FIG. 2, the synthetic polymer membrane 3 included in the film 1 contains the organic carboxylic acid (CA). A droplet of a microorganism-containing liquid L is adhered to the surface of the synthetic polymer membrane 3. FIG. 3 shows a next step after FIG. 2. As shown in FIG. 3, the microorganism-containing liquid L gradually wets and spreads on the surface of the synthetic polymer membrane 3, as well as permeates inside the moth eye structure (capillary phenomenon). Note that the photocatalyst particle 4 has high hydrophilicity. Thus the photocatalyst particle 4 facilitates a phenomenon of the microorganism-containing liquid L wetting and spreading on the surface of the synthetic polymer membrane 3, and a phenomenon of permeating inside the moth eye structure (capillary phenomenon). FIG. 4 shows a next step of FIG. 3. As shown in FIG. 4, the microorganism-containing liquid L wets and spreads on the surface of the synthetic polymer membrane 3, as well as permeates fully inside the moth eye structure, and forms a liquid membrane that coats the synthetic polymer membrane 3. This enlarges the contact areas of the synthetic polymer membrane 3 and the microorganism-containing liquid L. Along with this, a portion of the organic carboxylic acid (CA) contained in the synthetic polymer membrane 3 permeates the microorganism-containing liquid L. The organic carboxylic acid (CA) exerts the germicidal action described above together with the photocatalyst particle 4. FIG. 5 shows a next step after FIG. 4. As shown in FIG. 5, the microorganism-containing liquid L has reduced volume due to evaporation, and increased concentration of the organic carboxylic acid (CA). This improves germicidal action caused by the organic carboxylic acid (CA). Finally, the microorganism-containing liquid L fully evaporates. Along with this, the organic carboxylic acid (CA) contained in the microorganism-containing liquid L is absorbed by the synthetic polymer membrane 3. The synthetic polymer membrane 3 breaks a microorganism membrane by the protrusion 3a, thereby exerting more germicidal action. In this way, with reference to FIGS. 2-5, description has been made for germicidal action in the synthetic polymer membrane 3 containing the organic carboxylic acid (CA).

Examples of methods of adding an organic carboxylic acid to the synthetic polymer membrane 3 include a method of adding beforehand an organic carboxylic acid to the photocuring resin composition described above, and a method of adding a component to generate an organic carboxylic acid as a photolyzed product or a pyrolyzed product (hereinafter sometimes described as an acid generator) to the photocuring resin composition described above. Note that the film 1 can be produced in a roll-to-roll technique as described later. In this production method, an uncured synthetic polymer membrane formed by the photocuring resin composition is brought into contact with a cylindrical moth eye shaping die. In this case, pre-addition of an organic carboxylic acid to the photocuring resin composition may reduce releasability of the uncured synthetic polymer membrane and the moth eye shaping die. Accordingly, the method of adding an organic carboxylic acid to the synthetic polymer membrane 3 is preferably a method of adding an acid generator to the photocuring resin composition described above.

Examples of the acid generators include polymerization initiators (particularly, photopolymerization initiators), and compounds not to function as polymerization initiators. The acid generator is preferably a photopolymerization initiator. Addition of a photopolymerization initiator to the uncured synthetic polymer membrane described above enables simultaneously performing curing of the uncured synthetic polymer membrane and addition of an organic carboxylic acid. In summary, the synthetic polymer membrane 3 is preferably a cured material of a photocuring resin composition that contains a photopolymerization initiator. The organic carboxylic acid is preferably a photolyzed product of a photopolymerization initiator.

Examples of the photopolymerization initiators include acetophenone-based photopolymerization initiators such as p-tert-butyltrichloroacetophenone, 2,2'-diethoxyacetophenone, and 2-hydroxy-2-methyl-1-phenylpropane-1-one; ketone-based photopolymerization initiators such as benzophenone, 4,4'-bisdimethylaminobenzophenone, 2-chlorothioxanthone, 2-methylthioxanthone, 2-ethylthioxanthone, and 2-isopropylthioxanthone; benzoin ether-based photopolymerization initiators such as benzoin, benzoin methyl ether, benzoin isopropyl ether, and benzoin isobutyl ether; benzyl ketal-based photopolymerization initiators such as benzyl dimethyl ketal and hydroxycyclohexyl phenyl ketone; acylphosphine oxide-based photopolymerization initiators such as bis(2,4,6-trimethylbenzoyl)-phenylphosphine oxide and diphenyl (2,4,6-trimethoxybenzoyl) phosphine oxide; alkylphenone-based photopolymerization initiators such as 1-hydroxy-cyclohexyl-phenyl-ketone.

The photopolymerization initiator is preferably acylphosphine oxide-based photopolymerization initiator, and more preferably bis(2,4,6-trimethylbenzoyl)-phenylphosphine oxide, in view of improving germicidal action. A photolyzed product of bis(2,4,6-trimethylbenzoyl)-phenylphosphine oxide is 2,4,6-trimethyl benzoic acid.

The content ratio of an organic carboxylic acid in the synthetic polymer membrane 3 is preferably 0.1% by mass or more to 10.0% by mass or less, and more preferably 0.5% by mass or more to 2.0% by mass or less. Providing a content ratio of an organic carboxylic acid of 0.1% by mass or more enables further improvement of germicidal action of the film 1. Providing a content ratio of an organic carboxylic acid of 10.0% by mass or less enables suppression of breed out of the organic carboxylic acid.

In the film 1, the pH of an aqueous solution derived by dropping 200 μL of water on the surface of the synthetic polymer membrane 3 side and recovering it after 5 minutes is preferably 7.0 or less, more preferably 5.0 or less, and even more preferably 4.5 or less. The photocatalyst (e.g., tungsten oxide) may become unstable in a high pH environment. Accordingly, providing the above-described pH as 7.0 or less enables improvement of germicidal action and deodorant action by the photocatalyst particle. Furthermore, since relatively many kinds of microorganisms are weak in a low pH environment, providing the above-described pH as 5.0 or less enables further improvement of germicidal action of the film 1. Examples of methods of adjusting the pH described above include a method of adding an acid (particularly, an organic carboxylic acid) to the synthetic polymer membrane 3, and a method of introducing an acid group to a synthetic polymer contained in the synthetic polymer membrane 3. Here, the pH described above is preferably 3.0 or more, and more preferably 4.0 or more, in view of suppressing corrosion due to the film 1.

Surface Adjuster

The synthetic polymer membrane 3 preferably contains a surface adjuster. The surface adjuster improves hydrophilicity of the surface of the synthetic polymer membrane 3. With the synthetic polymer membrane 3 containing the surface adjuster, once a microorganism-containing liquid is adhered to the surface of the synthetic polymer membrane 3, the microorganism-containing liquid wets and spreads on the surface of the synthetic polymer membrane 3 more easily, and permeates inside the moth eye structure more easily. Consequently, microorganisms contained in the liquid contacts more easily the photocatalyst particle 4. This further improves germicidal action of the film 1. Examples of the surface adjusters include glycerin fatty acid ester and allylamine polymer.

The content ratio of the surface adjuster in the synthetic polymer membrane 3 is preferably 0.1% by mass or more to 10.0% by mass or less, and more preferably 0.5% by mass or more to 3.0% by mass or less. Providing a content ratio of the surface adjuster of 0.1% by mass or more enables sufficient improvement of hydrophilicity of the surface of the synthetic polymer membrane 3. Providing a content ratio of the surface adjuster of 10.0% by mass or less enables suppression of breed out of the surface adjuster.

Other Components

Additionally, the synthetic polymer membrane 3 may contain a component other than a synthetic polymer, an organic carboxylic acid, and a surface adjuster (e.g., a component having germicidal action other than organic carboxylic acids, a leveling agent, and a lubricant).

Photocatalyst Particle

The photocatalyst particle 4 is supported on the surface of the synthetic polymer membrane 3. It is preferable that no chemical bond (e.g., ionic bond and covalent bond) be present between the photocatalyst particle 4 and the synthetic polymer membrane 3. The moth eye structure formed in the synthetic polymer membrane 3 has a large surface area. Accordingly, the photocatalyst particle 4 and the synthetic polymer membrane 3 can have sufficient absorbance even with no chemical bond.

The photocatalyst particle 4 is a particle having a photocatalyst as a major component. Examples of the photocatalyst include titanium oxide and tungsten oxide. Among them, tungsten oxide exerts photocatalyst activity in invisible light. The film 1 is envisaged to be used e.g., indoor. The photocatalyst is thus preferably tungsten oxide. The content ratio of tungsten oxide in the photocatalyst particle 4 is preferably 90% by mass or more, and more preferably 97% by mass or more.

Examples of the tungsten oxide include $WO_3$ (tungsten trioxide), $WO_2$, $WO$, $W_2O_3$, $W_4O_5$, $W_4O_{11}$, $W_{25}O_{73}$, $W_{20}O_{58}$, and $W_{24}O_{68}$, and a mixture thereof. The tungsten oxide is preferably WO3 in view of further improving deodorant action and germicidal action of the film 1.

The crystal structure of tungsten oxide contained in the photocatalyst particle 4 is not particularly limited. Examples of the crystal structures of tungsten oxide include monoclinic crystal, triclinic crystal, orthorhombic crystal, and mixed crystal of at least two kinds thereof.

The photocatalyst particle 4 may be a composite particle that includes a tungsten oxide core particle substantially containing only tungsten oxide, and a catalytic promoter supported by the tungsten oxide core particle. Use of such a composite particle enables further improvement of deodorant action and germicidal action of the film 1. The tungsten oxide core particle may support only a single type of catalytic promoter, or two or more types of catalytic promoters.

Examples of metals contained in the catalytic promoter include platinum (Pt), gold (Au), silver (Ag), copper (Cu), zinc (Zn), palladium, iron, nickel, ruthenium, iridium, niobium, zirconium, and molybdenum. These metals may be contained in a form of e.g., a complex, a chloride, a bromide, an iodide, an oxide, a hydroxide, a sulfate, a nitrate, a carbonate, an acetate, a phosphate, or an organic acid salt in the catalytic promoter. Preferable examples of the catalytic promoters include platinum. The photocatalyst particle 4 is preferably a composite particle that includes a tungsten oxide core particle, and platinum as a catalytic promoter supported on the tungsten oxide core particle.

The content ratio of the catalytic promoter in the photocatalyst particle 4 (hereinafter, sometimes described as a catalytic promoter supported rate) is preferably 0.01% by mass or more to 3% by mass or less. Providing a catalytic promoter supported rate of 0.01% by mass or more to 3% by mass or less enables further improvement of deodorant action and germicidal action of the film 1.

The mean particle diameter of the photocatalyst particles 4 is preferably 20 nm or more to 1000 nm or less, more preferably 30 nm or more to 500 nm or less, and even more preferably 40 nm or more to 200 nm or less. Providing a mean particle diameter of the photocatalyst particles 4 of 20 nm or more enables further improvement of photocatalyst activity of the photocatalyst particles 4, and this results in further improvement of deodorant action and germicidal action of the film 1. Providing a mean particle diameter of the photocatalyst particle 4 of 1000 nm or less enables suppression of release of the photocatalyst particle 4 from the synthetic polymer membrane 3.

Moreover, providing a mean particle diameter of the photocatalyst particles 4 of 35 nm or less (preferably 30 nm or less) enables use of the film 1 as an anti-reflective membrane having an excellent anti-reflective effect. Note that a moth eye structure was originally found as a structure that confers an excellent anti-reflective effect. The synthetic polymer membrane 3, which has a moth eye structure formed, thus has an excellent anti-reflective effect. Meanwhile, the photocatalyst particles 4 tend to exhibit a masking property and make the film 1 opaque. Accordingly, use of the film 1 as an anti-reflective membrane requires reduction of the masking property of the photocatalyst particles 4. The masking property of the photocatalyst particles 4 is maximum when the particle diameter of the photocatalyst particle 4 is about a half of wavelength of visible light (i.e., with a particle diameter of about 200-300 nm). The photocatalyst particle 4 tends to exhibit an excellent transparency when the particle diameter is below a half of wavelength of visible light. Normally, the photocatalyst particle 4 having a particle diameter of 100 nm or less is transparent. Note that the particle diameters of the photocatalyst particles 4 exhibits a distribution. Obtaining the photocatalyst particles 4 that do not include the photocatalyst particle 4 with a particle diameter of more than 100 nm requires adjustment of the photocatalyst particles 4 to have a mean particle diameter of 35 nm or less.

In the surface of the synthetic polymer membrane 3, the supported amount of the photocatalyst particle 4 is preferably 0.01 g/m$^2$ or more to 1.0 g/m$^2$ or less, more preferably 0.05 g/m$^2$ or more to 0.5 g/m$^2$ or less, and even more preferably 0.1 g/m$^2$ or more to 0.3 g/m$^2$ or less. Providing a supported amount of the photocatalyst particle 4 of 0.01 g/m$^2$ or more enables further improvement of deodorant action and germicidal action of the film 1. Providing a supported amount of the photocatalyst particle 4 of 1.0 g/m$^2$ or less enables suppression of release of the photocatalyst particle 4 from the film 1 and adhesion to the surroundings.

Figure 6:
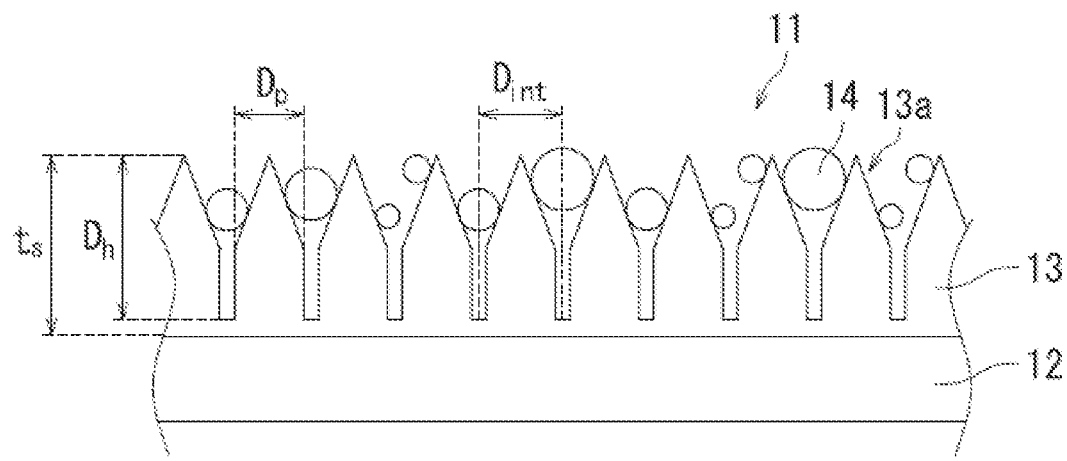
FIG. 6 shows an example of films according to an embodiment of the present invention, other than FIG. 1.

FIG. 6 shows a schematic cross-sectional view of a film 11, which is another example of the films according to an embodiment of the present invention. The film 11 shown in FIG. 6 include a base film 12, a synthetic polymer membrane 13 formed on the base film 12, and a photocatalyst particle 14 supported on the surface of the synthetic polymer membrane 13. The synthetic polymer membrane 13 has a plurality of protrusions 13a on the surface. The plurality of protrusions 13a configures a moth eye structure. The film 11 in FIG. 6 has a different structure of the protrusion 13a included in the synthetic polymer membrane 13, relative to the film 1 in FIG. 1. Description may be omitted for common characteristics to the film 1.

As seen from a normal line direction of the synthetic polymer membrane 13, the two-dimensional size $D_p$ of the protrusion 13a is in the range of more than 20 nm to less than 500 nm. In addition, the adjacent distance $D_{int}$ of the protrusions 13a is typically more than 20 nm to 1000 nm or less, and meets $D_p < D_{int}$. In other words, the synthetic polymer membrane 13 has a flat part present between the protrusions 13a adjacent to each other. The protrusion 13a has a cylindrical shape having a conical portion on an air side, and the height $D_h$ of the protrusion 13a is typically 50 nm or more to less than 500 nm. The protrusion 13a may also be arranged regularly or irregularly. When the protrusion 13a is arranged regularly, $D_{int}$ also indicates an arrangement period. The same is also inevitably applied to the synthetic polymer membrane 13 in FIG. 1.

Note that herein the term "moth eye structure" encompasses not only a nano surface structure that is configured of protrusions having a shape increasing a cross-sectional area (a cross section parallel to a membrane face) like the protrusion 3a of the synthetic polymer membrane 3 shown in FIG. 1 and has an excellent reflection function, but also a nano surface structure configured of protrusions having a portion with a constant cross-sectional area (a cross section parallel to a membrane face) like the protrusion 13a of the synthetic polymer membrane 13 shown in FIG. 6. Additionally, it is preferable to have a conical portion for breaking a cell wall and/or cell membrane of a microorganism. Nevertheless, the tip of the conical shape is not necessarily required to have a nano surface structure, and may have roundness similar to that of a nanopillar configuring a nano surface structure included in a wing of a cicada (about 60 nm).

Production Method of Film

The film according to an embodiment of the present invention can be produced by e.g., a method including a process of preparing a synthetic polymer membrane having a moth eye structure formed, and a process of providing photocatalyst particles supported on the surface of the synthetic polymer membrane (a surface having the plurality of protrusions described above).

Examples of methods of supporting photocatalyst particles on the surface of the synthetic polymer membrane include a method of applying a photocatalyst particle composition containing photocatalyst particles on the surface of the synthetic polymer membrane. The photocatalyst particle composition preferably contains water as a dispersion medium. After applying the photocatalyst particle composition on the surface of the synthetic polymer membrane, the synthetic polymer membrane is preferably heated to evaporate the dispersion medium.

Hereinafter, description will be made for an example of methods of preparing a synthetic polymer membrane having a moth eye structure formed.

The synthetic polymer membrane having a moth eye structure formed as illustrated in FIG. 1 and FIG. 6 is obtained by e.g., using a die having an inverted moth eye structure (hereinafter referred to as "moth eye shaping die"). When an anodized porous alumina layer having an inverted moth eye structure is employed directly as a die, a moth eye structure can be produced with low cost. Particularly, when a cylindrical moth eye shaping die is used, a moth eye structure can be produced efficiently by a roll-to-roll technique. Such a moth eye shaping die can be produced by a method described in Japanese Patent Application Laid-Open Publication No. 2009-166502, WO2011/125486, and WO2013/183576.

Referring to FIGS. 7-11, description will be made for a production method of a moth eye shaping die 26 for forming the synthetic polymer membrane 3 in FIG. 1.

Figure 7:
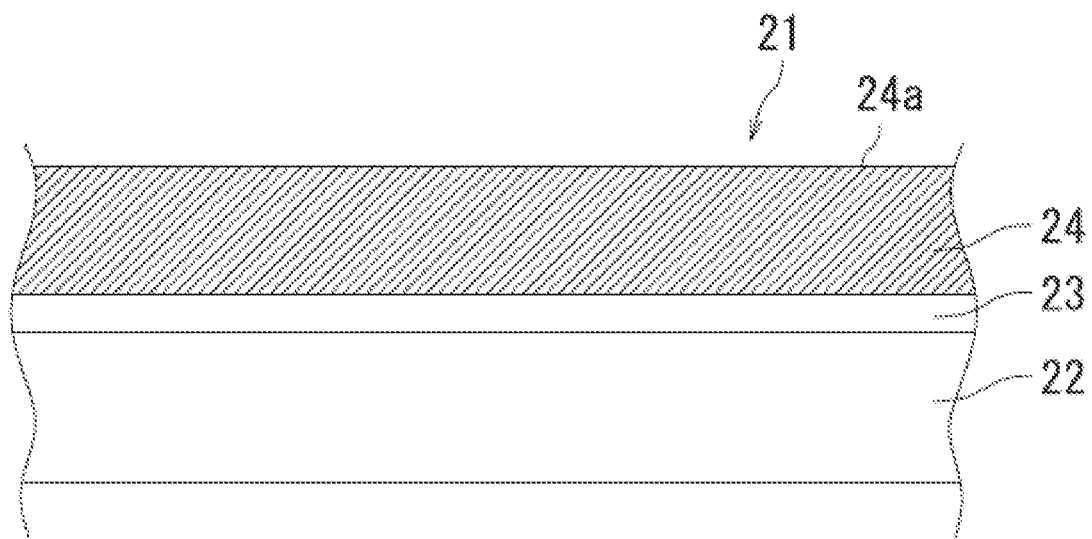
FIG. 7 shows a process of a production method of a moth eye shaping die used for forming a moth eye structure in FIG. 1.

First, as shown in FIG. 7, a die matrix 21 is prepared. The die matrix 21 has an aluminum matrix 22, an inorganic material layer 23 formed on the surface of the aluminum matrix 22, and an aluminum membrane 24 deposited on the inorganic material layer 23.

As the aluminum matrix 22, an aluminum matrix with relatively high rigidity is used in which the purity of aluminum is 99.50% by mass or more to less than 99.99% by mass. Impurities contained in the aluminum matrix 22 preferably includes at least one element selected from a group consisting of iron (Fe), silicon (Si), copper (Cu), manganese (Mn), zinc (Zn), nickel (Ni), titanium (Ti), lead (Pb), tin (Sn), and magnesium (Mg), and particularly, Mg is preferable. A mechanism of forming a pit (hollow) in an etching process is a cell reaction localized, and thus it is preferable the aluminum matrix 22 be used which ideally contains no element more noble than aluminum but contains Mg (having a standard electrode potential of −2.36V), which is a poor metal, as an impurity element. When the content ratio of an element more noble than aluminum is 10 ppm or less, it can be said to contain substantially no noble element as described above in view of electrochemistry. The content ratio of Mg is preferably 0.1% by mass or more of the total, and more preferably in the range of about 3.0% by mass or less. With a content ratio of Mg of less than 0.1% by mass, a sufficient rigidity cannot be obtained. By contrast, with a larger content ratio, segregation of Mg is more likely to occur. Although occurrence of the segregation around a surface that forms a moth eye shaping die induces no electrochemical problem, Mg forms an anodized membrane in a form different from aluminum and thus causes a defect. The content ratio of the impurity element only need be appropriately set corresponding to the shape, thickness, and size of the aluminum matrix 22, and corresponding to required rigidity. For example, in preparation of the aluminum matrix 22 having a plate shape by rolling, it is appropriate that the content ratio of Mg be about 3.0% by mass; and in preparation of the aluminum matrix 22 having a spatial structure such as a cylinder by extrusion, it is preferable that the content ratio of Mg be 2.0% by mass or less. With the content ratio of Mg of more than 2.0% by mass, extrusion processability is generally reduced.

As the aluminum matrix 22, a cylindrical aluminum tube formed of e.g., JIS-A1050, Al—Mg-based alloy (e.g., JIS-A5052), or Al—Mg—Si-based alloy (e.g., JIS-A6063) is used.

The surface of the aluminum matrix 22 is preferably treated with tool cutting. When the surface of the aluminum matrix 22 has e.g., abrasive grains remaining thereon, a part including abrasive grains has conduction facilitated between the aluminum membrane 24 and the aluminum matrix 22. In addition to abrasive grains, a place with presence of a protrusion and a cavity has local conduction facilitated between the aluminum membrane 24 and the aluminum matrix 22. Once local conduction is made between the aluminum membrane 24 and the aluminum matrix 22, a cell reaction can occur locally between impurities in the aluminum matrix 22 and the aluminum membrane 24.

As a material for the inorganic material layer 23, for example, tantalum oxide ($Ta_2O_5$) or silicon dioxide ($SiO_2$) can be used. The inorganic material layer 23 can be formed by e.g., sputtering. When a tantalum oxide layer is used as the inorganic material layer 23, the thickness of the tantalum oxide layer is e.g., 200 nm.

The thickness of the inorganic material layer 23 is preferably 100 nm or more to less than 500 nm. With the thickness of the inorganic material layer 23 of less than 100 nm, a defect (mainly a void, i.e., a space between crystal particles) may be generated in the aluminum membrane 24. By contrast, with the thickness of the inorganic material layer 23 of 500 nm or more, insulation occurs more easily between the aluminum matrix 22 and the aluminum membrane 24 depending on the surface condition of the aluminum matrix 22. Anodization of the aluminum membrane 24 by supplying current from the aluminum matrix 22 side to the aluminum membrane 24 requires the current to pass between the aluminum matrix 22 and the aluminum membrane 24. Employment of a configuration that supplies current from the inner face of the cylindrical aluminum matrix 22 eliminates need for providing an electrode in the aluminum membrane 24, and thus enables anodization over the whole surface of the aluminum membrane 24, as well as prevents occurrence of a problem in that current becomes less supplied along with progress of anodization, thereby allowing uniform anodization over the whole face of the aluminum membrane 24.

Furthermore, formation of the inorganic material layer 23 with more thickness generally requires longer time for membrane formation. When the membrane formation time is longer, the surface temperature of the aluminum matrix 22 rises unnecessarily, and may result in deterioration of membrane quality of the aluminum membrane 24 and generation of a defect (mainly a void). With a thickness of the inorganic material layer 23 of less than 500 nm, generation of such defect can also be suppressed.

The aluminum membrane 24 is a membrane formed of aluminum with a purity of 99.99% by mass or more (hereinafter sometimes referred to as "high-purity aluminum membrane") as described in e.g., WO2011/125486. The aluminum membrane 24 is formed using e.g., vacuum deposition or sputtering. The thickness of the aluminum membrane 24 is preferably in the range of about 500 nm or more to about 1500 nm or less, and is e.g., about 1 μm.

Additionally, as the aluminum membrane 24, an aluminum alloy membrane described in WO2013/183576 may be used instead of a high purity aluminum membrane. The aluminum alloy membrane described in WO2013/183576 contains aluminum, a metal element other than aluminum, and nitrogen. Herein the term "aluminum membrane" includes not only high purity aluminum membranes but also the aluminum alloy membrane described in WO2013/183576.

Use of the aluminum alloy membrane described above provides a mirror plane having a reflectance of 80% or more. The mean particle diameter of crystal particles configuring the aluminum alloy membrane as seen from a normal line direction of the aluminum alloy membrane is e.g., 100 nm or less, and the maximum surface roughness Rmax of the aluminum alloy membrane is 60 nm or less. The content ratio of nitrogen contained in the aluminum alloy membrane is e.g., 0.5% by mass or more to 5.7% by mass or less. Preferably, the absolute value of difference between the standard electrode potential of a metal element other than aluminum contained in the aluminum alloy membrane and the standard electrode potential of aluminum is 0.64 V or less, and the content ratio of the metal element in the aluminum alloy membrane is 1.0% by mass or more to 1.9% by mass or less. The metal element is e.g., Ti or Nd. Nevertheless, the metal element is not limited thereto, and another metal element may be used in which the absolute value of difference between the standard electrode potential of the metal element and the standard electrode potential of aluminum is 0.64 V or less (e.g., Mn, Mg, Zr, V, and Pb). Furthermore, the metal element may also be Mo, Nb, or Hf. The aluminum alloy membrane also contains two or more types of these metal elements. The aluminum alloy membrane is formed by e.g., DC magnetron sputtering. The thickness of the aluminum alloy membrane is also preferably in the range of about 500 nm or more to about 1500 nm or less, and is e.g., about 1 μm.

Figure 8:
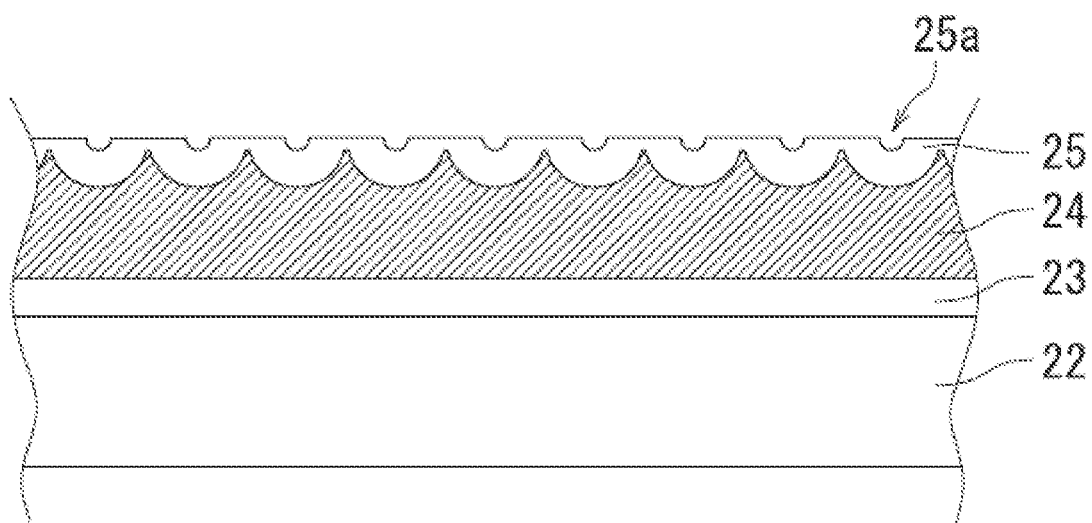
FIG. 8 shows a next process after FIG. 7.

Next, as shown in FIG. 8, a surface 24a of the aluminum membrane 24 is anodized, thereby forming a porous alumina layer 25 having a plurality of cavities (pores) 25a. The porous alumina layer 25 has a porous layer having the cavity 25a, and a barrier layer (the bottom of the cavity (pore) 25a). A space between the cavities 25a adjacent to each other (center-to-center distance) corresponds to substantially twice the thickness of the barrier layer, and is known to be substantially in proportion to a voltage at anodization. The relation also holds for the porous alumina layer 25 finally obtained and shown in FIG. 11.

The porous alumina layer 25 is formed by, e.g., anodizing the surface 24a in an acidic electrolyte. The electrolyte used in a process of forming the porous alumina layer 25 is e.g., an aqueous solution containing an acid selected from a group consisting of oxalic acid, tartaric acid, phosphoric acid, sulfuric acid, chromic acid, citric acid, and malic acid. For example, the surface 24a of the aluminum membrane 24 is anodized at an applied voltage of 80 V for 55 seconds using an aqueous oxalic acid solution (with a concentration of 0.3% by mass and at a liquid temperature of 10° C.), thereby forming the porous alumina layer 25.

Figure 9:
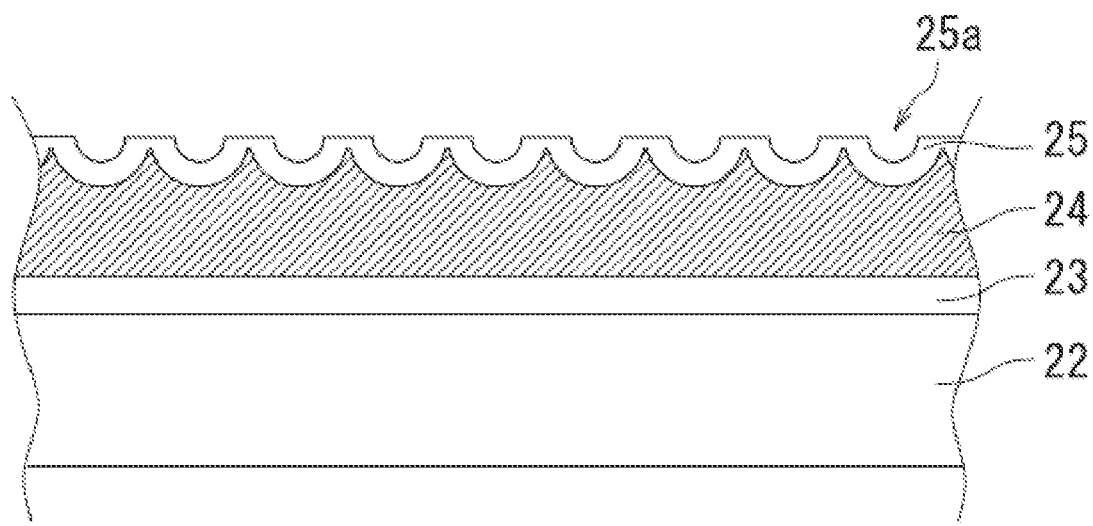
FIG. 9 shows a next process after FIG. 8.

Then, as shown in FIG. 9, the porous alumina layer 25 is etched in a predetermined amount by contact with an etchant of alumina, thereby enlarging an opening of the cavity 25a. Adjustment of the type and concentration of an etching solution and the duration of etching time enables control of the amount of etching (i.e., the size and depth of the cavity 25a). As the etching solutions, for example, 10% by mass of an organic acid such as phosphoric acid, formic acid, acetic acid, or citric acid, an aqueous solution of sulfuric acid, a mixed aqueous solution of chromic acid and phosphoric acid, or the like can be used. For example, an aqueous phosphoric acid solution (10% by mass, 30° C.) is used to perform etching for 20 minutes.

Figure 10:
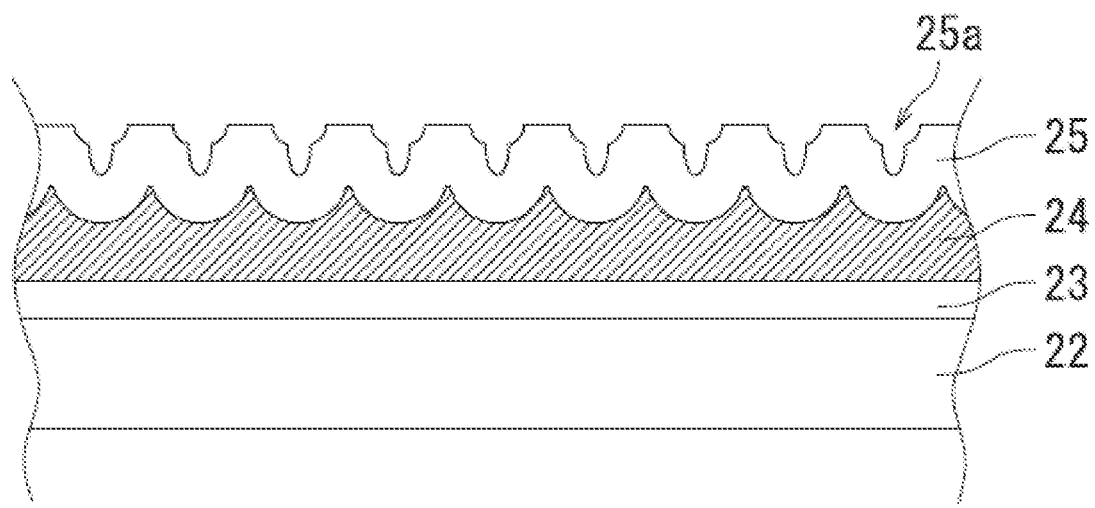
FIG. 10 shows a next process after FIG. 9.

Then, as shown in FIG. 10, the aluminum membrane 24 is again anodized partially, thereby growing the cavity 25a in a depth direction as well as making the porous alumina layer 25 thicker. Here, the growth of the cavity 25a starts from the bottom of the cavity 25a previously formed, and the side face of the cavity 25a thus has a stair shape.

Furthermore subsequently, as required, the porous alumina layer 25 is further etched by contact with an etchant of alumina, thereby further enlarging a bore size of the cavity 25a. As an etching solution, the etching solution described above is also preferably used here, and practically, it is only necessary to use the same etching bath.

Figure 11:
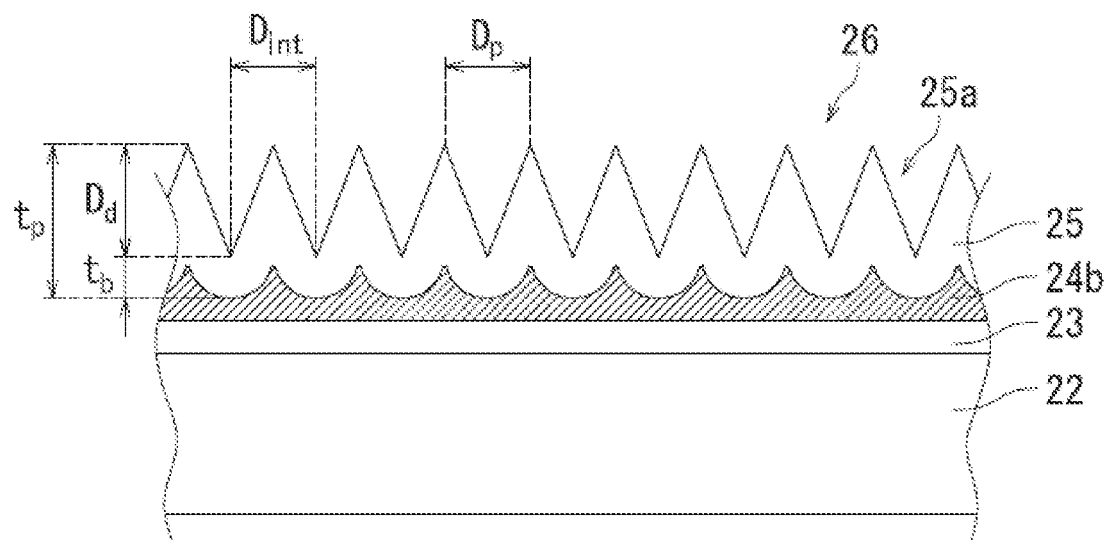
FIG. 11 shows a next process after FIG. 10.

In this manner, the anodized process and the etching process described above are alternately repeated a plurality of times (such as 5 times: 5 times of anodization and 4 times of etching), thereby obtaining the moth eye shaping die 26 including the porous alumina layer 25 having an inverted moth eye structure as shown in FIG. 11. Termination at the anodized process enables forming the bottom of the cavity 25a into a point. In other words, this provides a die that can form a cuspidate protrusion.

The porous alumina layer 25 shown in FIG. 11 (with a thickness $t_p$) has a porous layer (with a thickness corresponding to the depth $D_d$ of the cavity 25a) and a barrier layer (with a thickness tb). Since the porous alumina layer 25 has an inverted structure of a moth eye structure included in the synthetic polymer membrane 3, the same sign may be used for a corresponding parameter that characterizes the size.

The cavity 25a included in the porous alumina layer 25 has e.g., a circular cone shape, and may have a stair-shaped side face. It is preferable that the two-dimensional size $D_p$ of the cavity 25a (the area equivalent circle diameter of the cavity as seen from a normal line direction of the surface) be more than 20 nm to less than 500 nm, and that the depth $D_d$ be about 50 nm or more to less than 1000 nm (1 μm). Moreover, the bottom of the cavity 25a is preferably sharp (has the bottommost forming a point). In the cavities 25a densely packed, assuming that the shape of the cavity 25a is circular as seen from a normal line direction of the porous alumina layer 25, circles adjacent to each other overlap one another to form a saddle between the cavities 25a adjacent to each other. Here, when the nearly conical cavities 25a are adjacent to each other so as to form a saddle, the two-dimensional size $D_p$ of the cavity 25a is equal to the adjacent distance $D_{int}$. The thickness $t_p$ of the porous alumina layer 25 is e.g., about 1 μm or less.

Note that a residual aluminum layer 24b unanodized within the aluminum membrane 24 is present under the porous alumina layer 25 shown in FIG. 11. As required, the aluminum membrane 24 may be substantially fully anodized so as to eliminate presence of the residual aluminum layer 24b. For example, when the inorganic material layer 23 is thin, current can be easily supplied from the aluminum matrix 22 side.

The production method of a moth eye shaping die illustrated here can produce a die for making an anti-reflective membrane described in Japanese Patent Application Laid-Open Publication No. 2009-166502, WO2011/125486, and WO2013/183576. Since an anti-reflective membrane used for a high-definition display panel is required to have high uniformity, it is preferable to perform selection of a material of an aluminum matrix, mirror finishing of the aluminum matrix, control of purity, a component, or the like of the aluminum membrane as described above; nevertheless, high uniformity is not required for germicidal action, and thus the production method of die described above can be simplified. For example, the surface of an aluminum matrix may be anodized directly. Furthermore, even if a pit is formed at that time due to influence of impurities contained in the aluminum matrix, only a local structural irregularity occurs in a moth eye structure of the synthetic polymer membrane 3 obtained finally, with little effect on germicidal action.

Moreover, the production method of a die described above enables production of a die that is preferable for preparation of an anti-reflective membrane and has low regularity in an arrangement of cavities. It is considered that in use of germicidal action of a moth eye structure, regularity in an arrangement of the protrusions does not provide any effect. A die for forming a moth eye structure having regularly arranged protrusions can be produced e.g., as follows.

For example, after a porous alumina layer having a thickness of about 10 μm is formed, the porous alumina layer thus generated should just be eliminated by etching, followed by anodization under the condition of generating the porous alumina layer described above. The porous alumina layer having a thickness of 10 μm is formed by providing longer anodization time. Once a relatively thick, porous alumina layer is generated, followed by removal of this porous alumina layer in this manner, a porous alumina layer having regularly arranged cavities can be formed without any effect of cavities and protrusions due to grains present on the surface of the aluminum membrane or aluminum matrix, processing strain, or the like. Here, for the removal of the porous alumina layer, a mixture solution of chromic acid and phosphoric acid is preferably used. Long time etching may generate galvanic corrosion, but a mixture solution of chromic acid and phosphoric acid has an effect to suppress galvanic corrosion.

A moth eye shaping die for forming the synthetic polymer membrane 13 shown in FIG. 6 can also be produced basically by combining the anodized process and the etching process described above. Referring to FIGS. 12-15, description will be made for a production method of a moth eye shaping die 36 for forming the synthetic polymer membrane 13.

Figure 12:
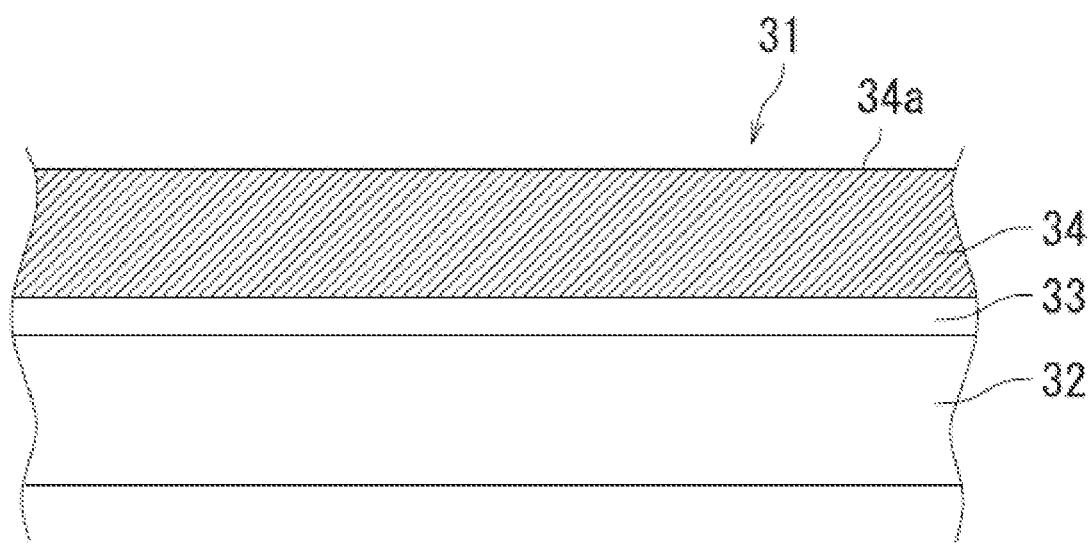
FIG. 12 shows a process of a production method of a moth eye shaping die used for forming a moth eye structure in FIG. 6.

First, as shown in FIG. 12, a die matrix 31 is prepared. The die matrix 31 has an aluminum matrix 32, an inorganic material layer 33 formed on the surface of the aluminum matrix 32, and an aluminum membrane 34 deposited on the inorganic material layer 33. Then, a surface 34a of the aluminum membrane 34 is anodized, thereby forming a porous alumina layer 35 having a plurality of cavities (pores) 35a.

Figure 13:
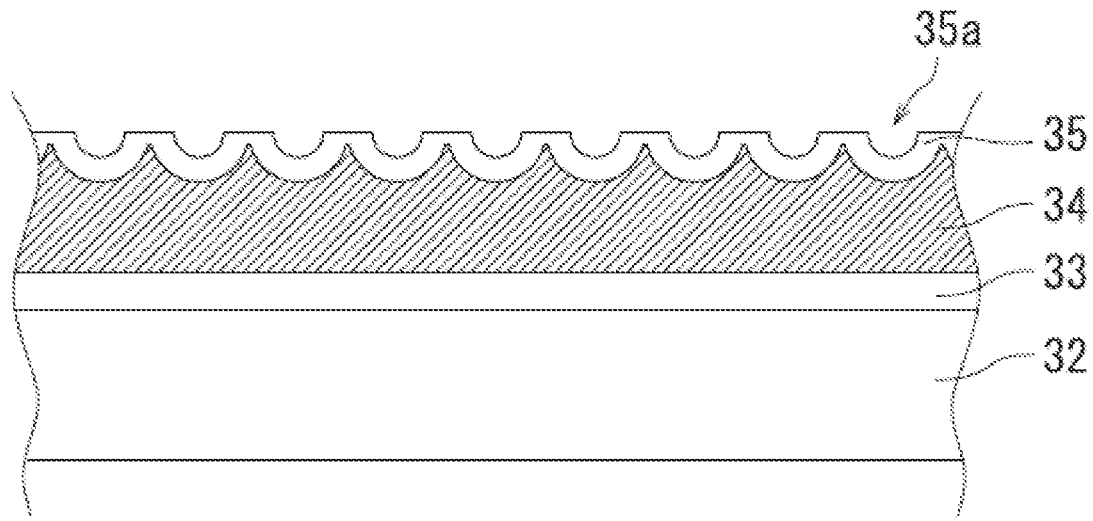
FIG. 13 shows a next process after FIG. 12.

Next, as shown in FIG. 13, the porous alumina layer 35 is etched in a predetermined amount by contact with an etchant of alumina, thereby enlarging an opening of the cavity 35a. At that time, the amount of etching is brought lower than that in the etching process described with reference to FIG. 9. In other words, the size of the opening of the cavity 35a is reduced. For example, an aqueous phosphoric acid solution (10% by mass, 30° C.) is used to perform etching for 10 minutes.

Figure 14:
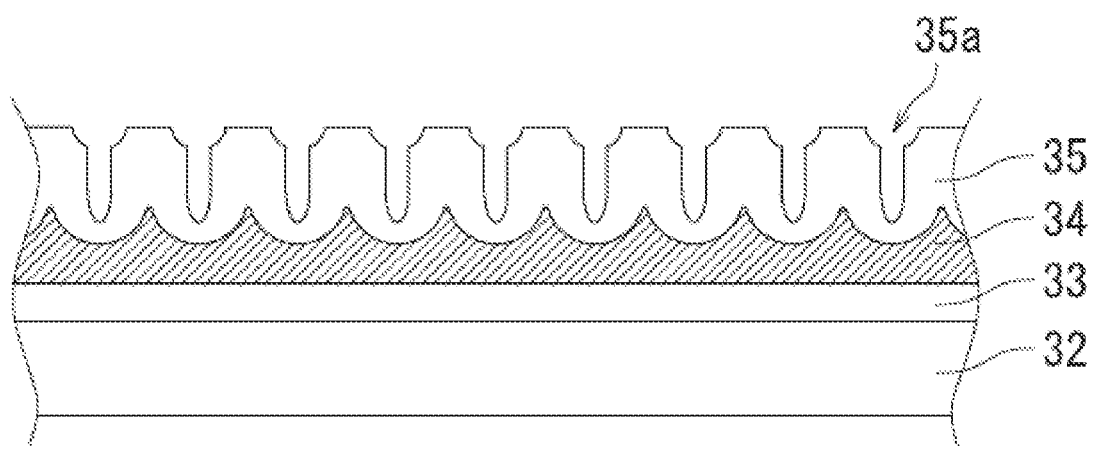
FIG. 14 shows a next process after FIG. 13.

Then, as shown in FIG. 14, the aluminum membrane 34 is again anodized partially, thereby growing the cavity 35a in a depth direction, as well as making the porous alumina layer 35 thicker. At that time, the cavity 35a is grown deeper than that in the anodized process described with reference to FIG. 10. For example, using an aqueous oxalic acid solution (with a concentration of 0.3% by mass and at a liquid temperature of 10° C.), anodization is performed at an applied voltage of 80 V for 165 seconds (55 seconds in FIG. 10).

Figure 15:
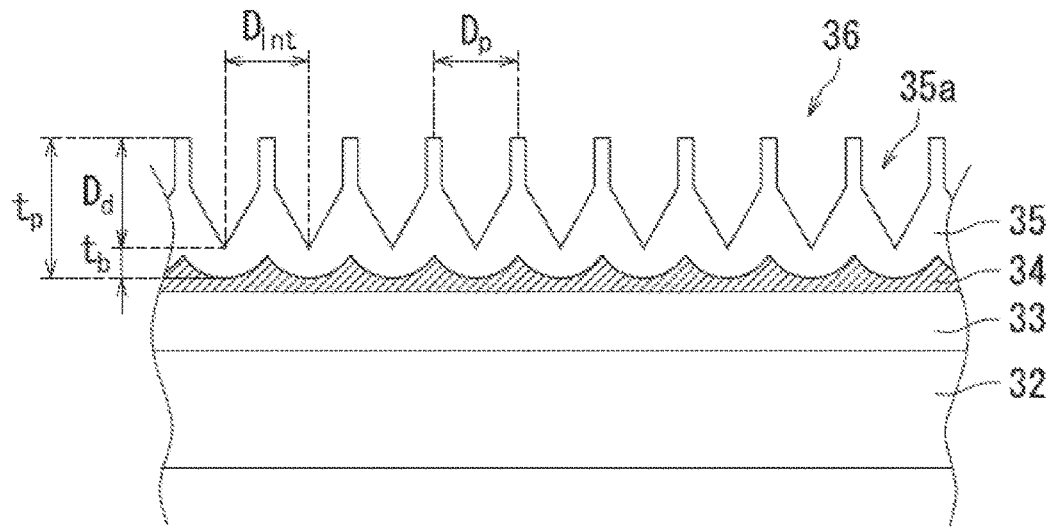
FIG. 15 shows a next process after FIG. 14.

Subsequently, in the same manner as described with reference to FIG. 11, the etching process and the anodized process are alternately repeated a plurality of times. For example, 3 times of the etching processes and 3 times of the anodized processes are alternately repeated, thereby obtaining the moth eye shaping die 36 including the porous alumina layer 35 having an inverted moth eye structure as shown in FIG. 15. At that time, the two-dimensional size $D_p$ of the cavity 35a is less than the adjacent distance $D_{int}$ ($D_p < D_{int}$).

The size of a microorganism varies depending on its type. For example, *Pseudomonas aeruginosa* has a size of about 1 μm, but some bacteria have a size of several hundred nm-about 5 μm, and fungi have a few μm or more length. For example, a protrusion having a two-dimensional size of about 200 nm is considered to have germicidal action on a microorganism having a size of about 0.5 μm or more, but possibly does not exert sufficient germicidal action on a bacteria having a size of several hundred nm, because of too large size of the protrusion. Additionally, the size of a virus is several tens nm-several hundred nm, and also many has a size of 100 nm or less. Note that a virus has no cell membrane, but has a protein shell surrounding viral nucleic acid, referred to as capsid. Viruses are classified into viruses having a membranous envelope outside the shell, and viruses having no envelope. In viruses having an envelope, the protrusion is considered to act on the envelope in the same manner because the envelope mainly consists of lipids. Examples of the viruses having an envelope include influenza virus and Ebola virus. In viruses having no envelope, the protrusion is considered to act on the protein shell, referred to as capsid, in the same manner.

In the manner as described above, it is possible to produce a moth eye shaping die that can form a variety of moth eye structures.

Figure 16:
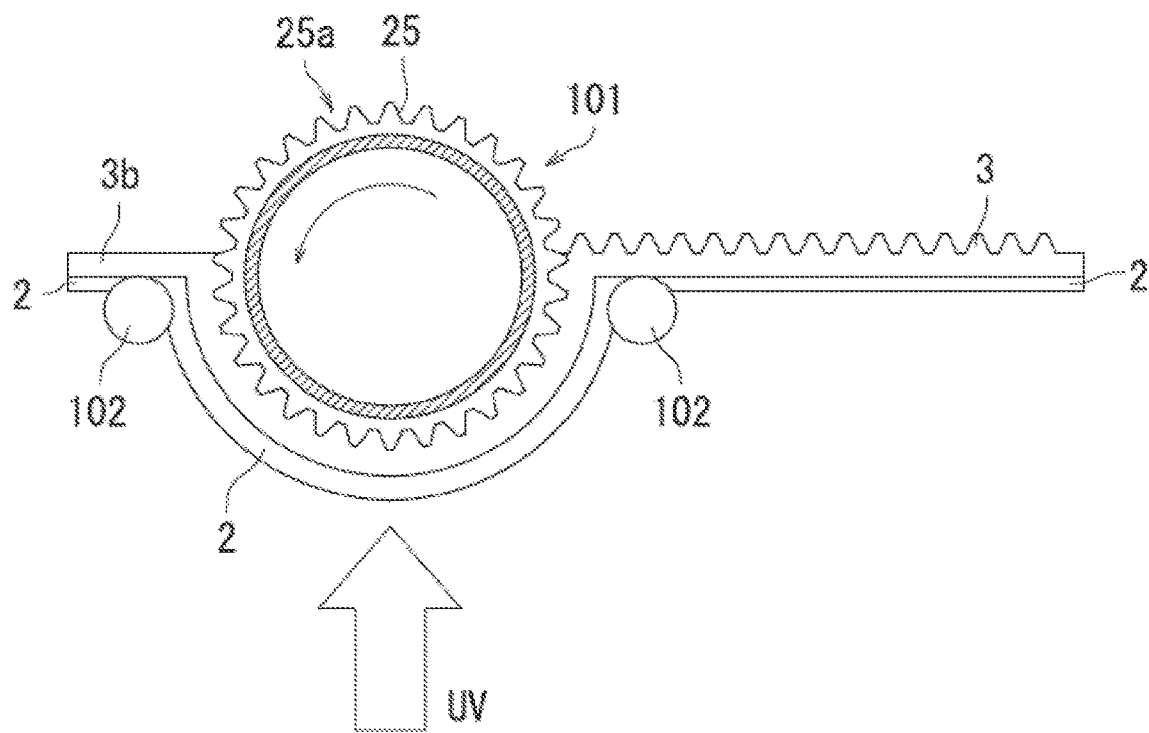
FIG. 16 shows an example of production methods of the film in FIG. 1.

Then, referring to FIG. 16, description will be made for a production method of the synthetic polymer membrane 3 using a moth eye shaping die 101. FIG. 16 is a schematic cross-sectional view for illustrating a method of producing the synthetic polymer membrane 3 by a roll-to-roll technique. The following description will be provided for a method of producing a synthetic polymer membrane on the surface of the base film 2 as a workpiece material with use of the moth eye shaping die 101 described above, but the method of producing the synthetic polymer membrane is not limited thereto, and another shaped die can be used to produce the synthetic polymer membrane 3 on a surface of a variety of workpiece material.

First, the cylindrical moth eye shaping die 101 is prepared. Here, the cylindrical moth eye shaping die 101 is e.g., the moth eye shaping die 26 produced by the production method described with reference to FIGS. 7-11.

Next, a photocuring resin composition (an ultraviolet curable resin composition in FIG. 16) is provided on the surface of the base film 2. With this, an uncured synthetic polymer membrane 3b containing a photocuring resin composition is formed on the base film 2. The base film 2 is e.g., PET (polyethylene terephthalate) film or TAC (triacetyl cellulose) film. The base film 2 is spread out from a spread roller not depicted, and subsequently provided with an ultraviolet curable resin composition on the surface by e.g., a slit coater.

Then, the uncured synthetic polymer membrane 3b is irradiated with light (ultraviolet rays (UV) in FIG. 16) with pressing the base film 2 having the uncured synthetic polymer membrane 3b formed on the surface, against the moth eye shaping die 101. With this, the ultraviolet curable resin composition contained in the uncured synthetic polymer membrane 3b is cured. The base film 2 is supported by two support rollers 102 as shown in FIG. 16. The support rollers 102 have a rotation mechanism and convey the base film 2. Moreover, the cylindrical moth eye shaping die 101 is rotated at a rotation speed corresponding to a conveyance speed of the base film 2, in a direction indicated by an arrow in FIG. 16.

Subsequently, the moth eye shaping die 101 is separated from the base film 2, thereby forming on the surface of the base film 2, the synthetic polymer membrane 3 in which an inverted moth eye structure of the moth eye shaping die 101 is transferred. The base film 2 having the synthetic polymer membrane 3 formed on the surface is retrieved by a retrieval roller not depicted.

The surface of the synthetic polymer membrane 3 has an inverted moth eye structure of a nano surface structure of the moth eye shaping die 101. The synthetic polymer membrane 13 shown in FIG. 6 can also be made depending on a nano surface structure of the moth eye shaping die 101 to be used. A material to form the synthetic polymer membrane 3 and the synthetic polymer membrane 13 is not limited to an ultraviolet curable resin composition, and can also employ a photocuring resin composition curable by visible light.

EXAMPLES

The present invention will now be further described with showing the examples. However, the present invention is not limited to the examples.

Additionally, in the examples, the mean particle diameter of tungsten oxide particles is a mean value of the particle diameters of one hundred tungsten oxide particles measured with a scanning electron microscope ("S-4700", manufactured by Hitachi High-Tech Corporation).

Preparation of Film

Films of Examples 1-15, Reference Examples 1-2, and Comparative Examples 1-6 were produced by the following method. First, Table 1 below shows a monomer, a surface adjuster, a polymerization initiator, an organic acid, and a photocatalyst dispersion used in production of each of the films. In the Table 1 below, EO group designates an ethylene oxide group. Molar number of EO designates the molar number of ethylene oxide groups.

TABLE 1

| Type | Abbreviation | Generic name | Active ingredient (% by mass) | EO group | Molar number of EO group |
|---|---|---|---|---|---|
| Monomer | M260 | Polyethylene glycol (400) diacrylate | 100 | Yes | 9 |
| | M282 | Polyethylene glycol (200) diacrylate | 100 | Yes | 4 |
| | M300 | Trimethyolpropane triacrylate | 100 | No | — |
| | APG400 | Polyethylene glycol (400) diacrylate | 100 | No | — |
| Surface adjuster | DL100 | Glycerin fatty acid ester | 100 | — | — |
| | PAA-03 | Allylamine polymer | 20 | — | — |
| Polymerization initiator | S19 | bis(2,4,6-trimethylbenzoyl)-phenylphosphine oxide | 100 | — | — |
| | 2959 | 1-[4-(2-hydroxyl)-phenyl]-2-hydroxy-methylpropanone | 100 | — | — |
| Organic acid | Succinic acid | Butanedioic acid | 100 | — | — |
| Aqueous photocatalyst dispersion | $WO_s$ | Aqueous dispersions of tungsten oxide particles | 20 | — | — |

The manufacturer and item number of each component described in Table 1 are shown below.

M280: "M280", manufactured by Miwon Specialty Chemical Co., Ltd.
M282: "M282", manufactured by Miwon Specialty Chemical Co., Ltd.
M300: "M300", manufactured by Miwon Specialty Chemical Co., Ltd.
APG400: "APG400", manufactured by Shin-Nakamura Chemical Co., Ltd.
DL100: "POEM DL100", manufactured by Riken Vitamin Co., Ltd.
PAA03: "PAA03" manufactured by Nittobo Medical Co., Ltd.
819: "Omnirad® 819", manufactured by IGM Resins B.V.
2959: "Omnirad® 2959", manufactured by IGM Resins B.V.
Succinic acid: "S0100 (product code)", manufactured by Tokyo Chemical Industry Co., Ltd.
Aqueous photocatalyst dispersion: a prepared item described later.

Polymerization initiator (819) is a polymerization initiator that generates free organic carboxylic acid (2,4,6-trimethyl benzoic acid) as a photolyzed product. Polymerization initiator (2959) is a polymerization initiator that generates little amount of free organic carboxylic acid as a photolyzed product. Here, Polymerization initiator (2959) possibly generates organic carboxylic acid itself as a photolyzed product. However, organic carboxylic acid generated from Polymerization initiator (2959) has a structure that facilitates incorporation into another component such as a resin, and thus can hardly be present as free organic carboxylic acid. Accordingly, Polymerization initiator (2959) is presumed to generate little amount of free organic carboxylic acid as a photolyzed product.

The following reaction formula represents a reaction in which Polymerization initiator (819) generates free organic carboxylic acid by photoreaction. In the following reaction formula, Compound (A) represents Polymerization initiator (819). hv represents light energy (ultraviolet energy).

[Chem 1]

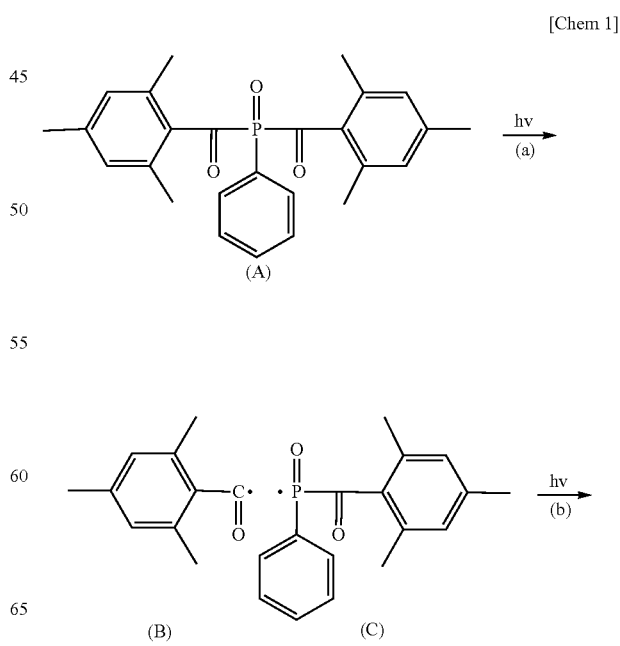

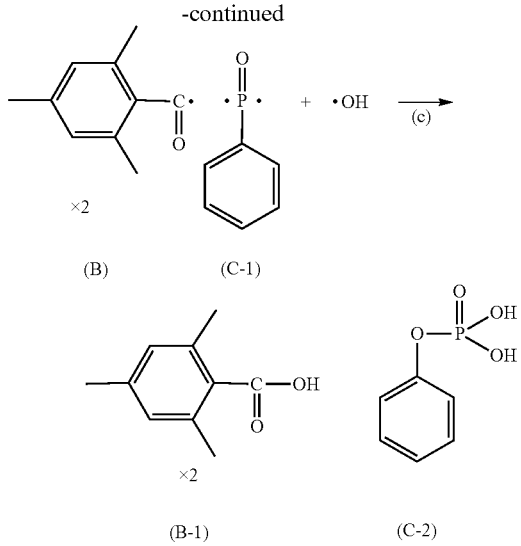

As shown in the reaction formula, Compound (A) is degraded by light energy and generates Compound (B) and Compound (C), which are radical compounds (Reaction (a)). Next, Compound (C) is further degraded by light energy and generates Compound (B) and Compound (C-1), which are radical compounds (Reaction (b)). These generate two molecules of Compound (B) and one molecule of Compound (C-1). Then, Compound (B) reacts with a hydroxyl radical (—OH) and generates Compound (B-1) (2,4,6-trimethyl benzoic acid), which is free organic carboxylic acid (Reaction (c)). Moreover, Compound (C-1) reacts with a hydroxyl radical (—OH) and generates Compound (C-2) (phenylphosphoric acid) (Reaction (c)).

Meanwhile, a hydroxyl radical (—OH) generates by the following reactions. First, ultraviolet irradiation generates ozone. The ozone thus generated is degraded into an oxygen molecule and an oxygen atom by effect of ultraviolet rays with long wavelength (e.g., a wavelength of 240 nm or more to 340 nm or less) (O3+ultraviolet rays→O+O$_2$). Some oxygen atoms react with ozone and generate stable oxygen molecules (O+O$_3$→2O$_2$). Meanwhile, some oxygen atoms generate hydroxyl radicals (.OH) by reacting with water molecules in air (O+H$_2$O→2 (.OH)). In addition, hydroxyl radicals (.OH) also associate with ozonolysis (O$_3$+2 (.OH) →H$_2$O+2O$_2$).

Aqueous Photocatalyst Dispersion

As aqueous photocatalyst dispersions (aqueous dispersions of tungsten oxide particles), the following four types of aqueous dispersions of tungsten oxide particles different in the mean particle diameters were prepared. A preparation method of the aqueous dispersions of tungsten oxide particles is shown below.

Aqueous dispersion of tungsten oxide particles (15): with a mean particle diameter of tungsten oxide particles of 15 nm.

Aqueous dispersion of tungsten oxide particles (40): with a mean particle diameter of tungsten oxide particles of 40 nm.

Aqueous dispersion of tungsten oxide particles (1000): with a mean particle diameter of tungsten oxide particles of 1000 nm.

Aqueous dispersion of tungsten oxide particles (1200): with a mean particle diameter of tungsten oxide particles of 1200 nm.

First Pulverization

A mixture of 200 g of raw material particles of tungsten oxide (for details, WO3, manufactured by Kishida Chemical Co., Ltd.) and 800 g of ion-exchanged water was subject to wet pulverization using a beads mill (wet-type media-agitation ultrafine grinding and dispersing machine "MSC50", manufacture by Nippon Coke & Engineering Co., Ltd.), thereby obtaining a dispersion liquid containing pulverized raw material particles of tungsten oxide. For the beads mill, beads (manufacture by Nikkato Corporation, diameter: 0.1 mm) were used. The above-described dispersion liquid thus obtained was directly used as a raw material of a catalytic promoter supporting process.

Support of Catalytic Promoter

In the above-described dispersion liquid obtained in the first pulverization, hexachloroplatinic (IV) acid hexahydrate (manufactured by Kishida Chemical Co., Ltd., solid concentration: 98.5%) was dissolved. The additive amount of hexachloroplatinic (IV) acid hexahydrate was set to an amount to provide a content ratio of a platinum simple substance of 0.025% by mass in tungsten oxide particles thus formed. This provided each of Aqueous dispersions of tungsten oxide particles (15), (40), (1000), and (1200) (all of them have an active ingredient concentration of 20% by mass). Additionally, in Aqueous dispersions of tungsten oxide particles (15), (40), (1000), and (1200), the mean particle diameter of tungsten oxide particles was adjusted by appropriately changing a condition of wet pulverization in the first pulverization.

Matrix

As a base film, a PET film having a thickness of 50 μm ("A4300", manufactured by TOYOBO Co., Ltd.) was prepared.

Moth Eye Shaping Die

Cylindrical moth-eye-shaping dies (1)-(3), which have an inverted moth eye structure, and a cylindrical flat-plate-shaping die, which has a flat surface, were prepared. $D_p$ and $D_{int}$ of a moth eye structure formed by each of the moth eye shaping dies were as follows. Each of the moth eye shaping die were produced by a method similar to the method shown in FIGS. 7-11.

Moth eye shaping die (1): $D_p$: 200 nm, $D_{int}$: 200 nm.
Moth eye shaping die (2): $D_p$: 100 nm, $D_{int}$: 100 nm.
Moth eye shaping die (3): $D_p$: 300 nm, $D_{int}$: 300 nm.

Example 1

Formation of Uncured Synthetic Polymer Membrane

A photocuring resin composition was obtained by mixing 50.0 mass parts of Monomer (M280), 50.0 mass parts of Monomer (M282), and 2.0 mass parts of Polymerization initiator (2959). The photocuring resin composition thus obtained was provided on the surface of the base film. With this, an uncured synthetic polymer membrane was formed on the base film.

Formation of Moth Eye Structure

Next, a moth eye structure was formed in the uncured synthetic polymer membrane 3b described above, by a method similar to that as described with reference to FIG. 16. For detail, the moth eye shaping die 101 (Moth eye shaping die (2)) was pressed against the uncured synthetic polymer membrane 3b on the base film 2. Then, the uncured synthetic polymer membrane 3b was irradiated with and exposed to ultraviolet rays, with pressing the moth eye shaping die 101 against the uncured synthetic polymer membrane 3b. The exposure amount of ultraviolet rays was about 200 mJ/cm² (by exposure amount based on ultraviolet rays with a wavelength of 375 nm). This provided a laminate including the base film 2, and the synthetic polymer membrane 3 laminated on the base film 2. The synthetic polymer membrane 3 included a moth eye structure ($D_p$: 100 nm, $D_{int}$: 100 nm). So far, a method of forming a moth eye structure have been described with reference to FIG. 16.

Support of Photocatalyst Particles

Subsequently, Aqueous dispersion of tungsten oxide particles (40) was diluted with water to prepare a photocatalyst particle composition. Then, the laminate described above was cut into a 50 mm×70 mm piece. Then, to the surface of the cut laminate (the surface of the synthetic polymer membrane side), the photocatalyst particle composition was applied using a film applicator ("Applicator No. 11" manufactured by AS ONE Corporation, with a wet membrane thickness of 25 μm). The dilution ratio of Aqueous dispersion of tungsten oxide particles (40) in preparing the photocatalyst particle composition was adjusted to a dilution ratio such that the application amount of tungsten oxide particles to be applied on the laminate was 0.2 g/m² Then, the post-application laminate was placed on a hot plate at 80° C. for 1 minute to evaporate water. With this, photocatalyst particles (tungsten oxide particles) were supported to the surface of the synthetic polymer membrane (with a supported amount of 0.2 g/m²). Consequently, the film of Example 1 was provided. The film of Example 1 included a base film, a synthetic polymer membrane that was laminated on the base film and had a moth eye structure on the surface, and photocatalyst particles supported on the surface of the synthetic polymer membrane.

Examples 2-15

The films of Examples 2-15 were obtained by a method similar to production of the film of Example 1 except for changing the following points. In production of the films of Examples 2-15, in preparation of a photocuring resin composition, the type and additive amount of a component to be added were changed as shown in Tables 2-3 below. In production of the films of Examples 2-15, the type of a moth eye shaping die for forming a moth eye structure was also changed as shown in Tables 2-3 below. Moreover, in production of the films of Examples 2-15, the type of an aqueous photocatalyst dispersion to be used for support of photocatalyst particles, and the supported amount of the photocatalyst particles were changed as shown in Tables 2-3 below. In Tables 2-3 below, the terms "part" and "%" represent mass parts and % by mass, respectively.

Reference Example 1

The base film described above (PET film with a thickness of 50 μm ("A4300", manufactured by TOYOBO Co., Ltd.)) was directly used as the film of Reference Example 1.

Reference Example 2

Aqueous dispersion of tungsten oxide particles (40) was diluted with water. Then, the base film described above (PET film with a thickness of 50 μm ("A4300", manufactured by TOYOBO Co., Ltd.)) was cut into a 50 mm×70 mm piece. Then, to the surface of the cut base film, Aqueous dispersion of tungsten oxide particles (40) diluted with water was applied using a film applicator ("Applicator No. 11" manufactured by AS ONE Corporation, with a wet membrane thickness: 25 μm). The dilution ratio of Aqueous dispersion of tungsten oxide particles (40) was adjusted to a dilution ratio such that the application amount of tungsten oxide particles to be applied on the base film was 0.2 g/m² Then, the post-application base film was placed on a hot plate at 80° C. for 1 minute to evaporate water. With this, photocatalyst particles (tungsten oxide particles) were supported to the surface of the synthetic polymer membrane (with a supported amount of 0.2 g/m²). Consequently, the film of Reference Example 2 was provided. The film of Reference Example 2 included a base film, and photocatalyst particles supported on the surface of the base film.

Comparative Examples 1-6

The films of Comparative Examples 1-6 were obtained by a method similar to production of the film of Example 1 except for changing the following points. In production of the films of Comparative Examples 1-6, in preparation of a photocuring resin composition, the type and additive amount of a component to be added were changed as shown in Table 4 below. In production of the films of Comparative Examples 1-6, the type of a moth eye shaping die for forming a moth eye structure was changed as shown in Table 4 below. Moreover, in production of the films of Comparative Examples 1-4, the type of an aqueous photocatalyst dispersion to be used for support of photocatalyst particles, and the supported amount of the photocatalyst particles were changed as shown in Table 4 below. Furthermore, in production of the films of Comparative Examples 5-6, photocatalyst particles were not supported. In Table 4 below, "part" and "%" represent mass parts and % by mass, respectively.

In other words, the film of Comparative Example 1 included a base film, and a synthetic polymer membrane that was laminated on the base film and had a flat surface.

The film of Comparative Example 2 included a base film, a synthetic polymer membrane that was laminated on the base film and had a flat surface, and photocatalyst particles supported on the surface of the synthetic polymer membrane.

The films of Comparative Examples 3 and 4 included a base film, and a synthetic polymer membrane that was laminated on the base film and had a moth eye structure on the surface.

In Comparative Examples 5 and 6, in preparation of a resin composition, Aqueous dispersion of tungsten oxide particles (40) was added in an amount shown in Table 4 below (internal addition). The films of Comparative Examples 5 and 6 included a base film, and a synthetic polymer membrane that was laminated on the base film and had a moth eye structure on the surface. The synthetic polymer membrane contained photocatalyst particles. In the film of Comparative Example 5, the content of photocatalyst particles was 0.5 g per 1 m² of film area (the supported amount is 0.5 g/m² in Table 4). In the film of Comparative Example 6, the content of photocatalyst particles was 1.0 g per 1 m² of film area (the supported amount is 1.0 g/m² in Table 4).

TABLE 2

| | | Photocuring resin composition | | | | | | | | | | Moth eye shaping die | | Photocatalyst particle | | |
|---|---|---|---|---|---|---|---|---|---|---|---|---|---|---|---|---|
| | | Monomer | | | | Polymerization initiator | Surface adjuster | | Organic acid | Aqueous photocatalyst dispersion | | | $D_p$ | Particle | Addition | Supported amount |
| | | M | M | M | APG | | DL | PAA | Succinic | | | $D_{int}$ | diameter | | |
| | Amount | 280 | 282 | 300 | 400 | 819 2959 | 100 | 03 | acid | WO$_3$ | Type | (nm) | (nm) | method | (g/m²) |
| Example 1 | Parts | 50.0 | 50.0 | — | — | — 2.0 | — | — | — | — | 2 | 100 | 40 | Support | 0.2 |
| | % | 49.0 | 49.0 | — | — | — 2.0 | — | — | — | — | | 100 | | | |
| Example 2 | Parts | 50.0 | 50.0 | — | — | — 2.0 | — | — | — | — | 1 | 200 | 40 | Support | 0.2 |
| | % | 49.0 | 49.0 | — | — | — 2.0 | — | — | — | — | | 200 | | | |
| Example 3 | Parts | 50.0 | 50.0 | — | — | — 2.0 | — | — | — | — | 3 | 300 | 40 | Support | 0.2 |
| | % | 49.0 | 49.0 | — | — | — 2.0 | — | — | — | — | | 300 | | | |
| Example 4 | Parts | 50.0 | 50.0 | — | — | — 2.0 | — | — | — | — | 1 | 200 | 15 | Support | 0.2 |
| | % | 49.0 | 49.0 | — | — | — 2.0 | — | — | — | — | | 200 | | | |
| Example 5 | Parts | 50.0 | 50.0 | — | — | — 2.0 | — | — | — | — | 1 | 200 | 1000 | Support | 0.2 |
| | % | 49.0 | 49.0 | — | — | — 2.0 | — | — | — | — | | 200 | | | |
| Example 6 | Parts | 50.0 | 50.0 | — | — | — 2.0 | — | — | — | — | 1 | 200 | 1200 | Support | 0.2 |
| | % | 49.0 | 49.0 | — | — | — 2.0 | — | — | — | — | | 200 | | | |
| Example 7 | Parts | 50.0 | 50.0 | — | — | — 2.0 | — | — | — | — | 1 | 200 | 40 | Support | 0.008 |
| | % | 49.0 | 49.0 | — | — | — 2.0 | — | — | — | — | | 200 | | | |
| Example 8 | Parts | 50.0 | 50.0 | — | — | — 2.0 | — | — | — | — | 1 | 200 | 40 | Support | 0.01 |
| | % | 49.0 | 49.0 | — | — | — 2.0 | — | — | — | — | | 200 | | | |

TABLE 3

| | | Photocuring resin composition | | | | | | | | | | Moth eye shaping die | | Photocatalyst particle | | |
|---|---|---|---|---|---|---|---|---|---|---|---|---|---|---|---|---|
| | | Monomer | | | | Polymerization initiator | Surface adjuster | | Organic acid | Aqueous photocatalyst dispersion | | | $D_p$ | Particle | Addition | Supported amount |
| | | M | M | M | APG | | DL | PAA | Succinic | | | $D_{int}$ | diameter | | |
| | Amount | 280 | 282 | 300 | 400 | 819 2959 | 100 | 03 | acid | WO$_3$ | Type | (nm) | (nm) | method | (g/m²) |
| Example 9 | Parts | 50.0 | 50.0 | — | — | — 2.0 | — | — | — | — | 1 | 200 | 40 | Support | 1.0 |
| | % | 49.0 | 49.0 | — | — | — 2.0 | — | — | — | — | | 200 | | | |
| Example 10 | Parts | 50.0 | 50.0 | — | — | — 2.0 | — | — | — | — | 1 | 200 | 40 | Support | 1.2 |
| | % | 49.0 | 49.0 | — | — | — 2.0 | — | — | — | — | | 200 | | | |
| Example 11 | Parts | 50.0 | 50.0 | — | — | — 2.0 | — | — | 1.0 | — | 1 | 200 | 40 | Support | 0.2 |
| | % | 48.5 | 48.5 | — | — | — 1.9 | — | — | 1.0 | — | | 200 | | | |
| Example 12 | Parts | 50.0 | 50.0 | — | — | 2.0 — | — | — | — | — | 1 | 200 | 40 | Support | 0.2 |
| | % | 49.0 | 49.0 | — | — | 2.0 — | — | — | — | — | | 200 | | | |
| Example 13 | Parts | — | — | 30.0 | 70.0 | 2.0 — | — | — | — | — | 1 | 200 | 40 | Support | 0.2 |
| | % | — | — | 29.4 | 68.6 | 2.0 — | — | — | — | — | | 200 | | | |
| Example 14 | Parts | — | — | 30.0 | 70.0 | — 2.0 | 1.0 | — | — | — | 1 | 200 | 40 | Support | 0.2 |
| | % | — | — | 29.1 | 68.0 | — 1.9 | 1.0 | — | — | — | | 200 | | | |
| Example 15 | Parts | 50.0 | 50.0 | — | — | — 2.0 | — | 1.0 | — | — | 1 | 200 | 40 | Support | 0.2 |
| | % | 48.5 | 48.5 | — | — | — 1.9 | — | 1.0 | — | — | | 200 | | | |

TABLE 4

| | | Photocuring resin composition | | | | | | | | | | Photocatalyst particle | | | |
|---|---|---|---|---|---|---|---|---|---|---|---|---|---|---|---|
| | | Monomer | | | | Polymerization initiator | Surface adjuster | | Organic acid | Aqueous photocatalyst dispersion | Moth eye shaping die | | Particle diameter $D_{int}$ (nm) | Addition method | Supported amount (g/m²) |
| | | M 280 | M 282 | M 300 | APG 400 | 819 2959 | DL 100 | PAA 03 | Succinic acid | WO₃ | Type | $D_p$ (nm) | | | |
| Reference Example 1 | Parts % | — — | — — | — — | — — | — — | — — | — — | — | — | — | — | — | — | — |
| Reference Example 2 | Parts % | — — | — — | — — | — — | — — | — — | — — | — | — | — | — | 40 | Support | 0.2 |
| Comparative Example 1 | Parts % | 50.0 49.0 | 50.0 49.0 | — — | — — | — — | 2.0 2.0 | — — | — | — | Flat plate | — | — | — | — |
| Comparative Example 2 | Parts % | 50.0 49.0 | 50.0 49.0 | — — | — — | — — | 2.0 2.0 | — — | — | — | Flat plate | — | 40 | Support | 0.2 |
| Comparative Example 3 | Parts % | 50.0 49.0 | 50.0 49.0 | — — | — — | — — | 2.0 2.0 | — — | — | — | 1 | 200 200 | — | — | — |
| Comparative Example 4 | Parts % | 50.0 49.0 | 50.0 49.0 | — — | — — | 2.0 2.0 | — — | — — | — | — | 1 | 200 200 | — | — | — |
| Comparative Example 5 | Parts % | 50.0 46.6 | 50.0 46.6 | — — | — — | — — | 2.0 1.9 | — — | — | 5.4 5.0 | 1 | 200 200 | 40 | Internal addition | (0.5) |
| Comparative Example 6 | Parts % | 50.0 44.1 | 50.0 44,1 | — — | — — | — — | 2.0 1.8 | — — | — | 11.3 10.0 | 1 | 200 200 | 40 | Internal addition | (1.5) |

Hereinafter, the term "surface" of the films of Examples 1-15 and Comparative Examples 1-6 represents the surface of a synthetic polymer membrane side unless otherwise stated. The term "surface" of the film of Reference Example 1 represents any of surfaces unless otherwise stated. The term "surface" of the film of Reference Example 2 represents the surface of a side supporting photocatalyst particles unless otherwise stated.

Contact Angle

Contact angles to water on the surface were measured for the films of Examples 1-15, Comparative Examples 1-6, and Reference Examples 1-2. Measurement was performed at a temperature of 23° C. First, about 10 μL of water (pure water) droplet was dropped on the surface of each of the films. Ten seconds after dropping, a contact angle to water on the surface of each of the films was measured using a contact angle meter ("PCA-1", manufactured by Kyowa Interface Science Co., Ltd.) Measurement was performed 5 times for each of the films, and their mean value was defined as the contact angle of each of the films. Measurement results are shown in Table 5 below.

pH

The pH of an aqueous solution recovered 5 minutes after contact of water with a surface (hereinafter sometimes referred to as surface pH) was measured for the films of Examples 1-15, Comparative Examples 1-6, and Reference Examples 1-2. Measurement was performed at a temperature of 23° C. First, deionized water was adjusted to pH=7.0±0.1 by adding 0.01 mol/L of hydrochronic acid and 0.011 mol/L of an aqueous sodium hydroxide solution. Next, 200 μL of the pH-adjusted water described above was dropped on the surface of each of the films with a micropipette. Five minutes after dropping, the pH of an aqueous solution on the surface of each of the films (a solution in which an ingredient contained in a synthetic polymer was dissolved in the water) was measured using the following measuring instrument in which an electrode for a flat plate was attached to a pH electrode. Measurement was performed 5 times for each of the films, and their mean value was defined as the pH of each of the films. Here, for a film on which dropped water did not wet and spread so much (a film with a droplet diameter of less than 20 mm), recovery was made by wiping by sampling sheet described below, and then the pH was measured with the measuring instrument described above. Measurement results are shown in Tables 5-7 below.

pH measuring instrument: "ISFET (semiconductor sensor) pH electrode 0040N-10D", manufactured by HORIBA Ltd.

Sampling sheet: "Sampling sheet B Y011A", manufactured by HORIBA Ltd.

Evaluation

Abrasion resistance, deodorant action and germicidal action were assessed for the films of Examples 1-15, Comparative Examples 1-6, and Reference Examples 1-2 by the following method. Evaluation results are shown in Table 5 below.

Abrasion Resistance

Three films for each of Examples 1-15, Reference Examples 1-2, and Comparative Examples 1-6 were prepared and subjected to the following test with N=3. For the surface of each of the films, rubbing test was performed with 100 rounds at a rate of 30 rounds per minute, with applying a weight of 2N (200 g) using a rubbing tester ("AB-301", manufactured by Tester Sangyo Co., Ltd.). In the rubbing test, a nonwoven wiper (BEMCOT, manufactured by Asahi Kasei Corporation) was used as an object material (rubbing partner material).

After and before the rubbing test, the amount of photocatalyst particles supported on or internally added to each of the films was measured. With this, the amount of photocatalyst particles before the rubbing test and the amount of photocatalyst particles after the rubbing test were measured for each of the films. Subsequently, the residual rate of photocatalyst particles after the rubbing test was calculated for each of the films by the following formula. Then, for the films of Examples 1-15, Reference Examples 1-2, and Comparative Examples 1-6, the mean value of individual residual rates of the three films used for providing N=3 was calculated. This was defined as residual rates of the films of Examples 1-15, Reference Examples 1-2, and Comparative Examples 1-6.

Residual rate (%)=100×the amount of photocatalyst particles after the rubbing test/the amount of photocatalyst particles before the rubbing test The amount of photocatalyst particles supported on or internally added to each of the films was measured with a fluorescent X-ray analyzer ("ZSX Primus II", manufactured by Rigaku Corporation). In the measurement, at first, several types of samples for creation of a calibration curve were made which have difference in the supported amount of photocatalyst particles (tungsten oxide particles). Then, peak intensities of tungsten oxide in the samples for creation of a calibration curve were measured with the fluorescent X-ray analyzer described above, and a calibration curve was created. Subsequently, a peak intensity of tungsten oxide in each of the films was measured with the fluorescent X-ray analyzer described above. The measured peak intensity was assigned to the calibration curve, thereby deriving the amount of photocatalyst particles (tungsten oxide particles) supported on or internally added to each of the films.

Abrasion resistance of the films of Examples 1-15, Reference Examples 1-2, and Comparative Examples 1-6 was determined along with the following criteria:

A (especially good): exhibiting a residual rate of 90% or more;
B (good): exhibiting a residual rate of 70% or more to less than 90%;
C (slightly good): exhibiting a residual rate of 50% or more to less than 70%; and
D (poor): exhibiting a residual rate of less than 50%.

Deodorant Action

Any of the films of Examples 1-15, Reference Examples 1-2, and Comparative Examples 1-6 was put into a 0.5 L volume transparent bag. Measuring gas (air containing 15 ppm of acetaldehyde) was filled in the gas bag, and then the gas bag was sealed. Subsequently, using blue LED, the surface of the film was irradiated with blue light (illuminance: 22000 lux) from the outside of the gas bag for 16 hours. Sixteen hours after irradiation, acetaldehyde concentration in the measuring gas within the gas bag (post-test acetaldehyde concentration) was measured. For measurement of acetaldehyde concentration, a gas detecting tube for acetaldehyde ("92L", manufactured by Gastec Corporation) was used. Note that tungsten oxide particles exert photocatalyst activity by absorbing light and degrades acetaldehyde to carbon dioxide. Accordingly, as photocatalyst activity of each of the films is higher, the acetaldehyde concentration within the gas bag is more reduced. The post-test residual gas rate of each of the films was calculated by the following formula.

Residual gas rate (%)=100×post-test acetaldehyde concentration/pre-test acetaldehyde concentration (15 ppm)

Deodorant action of the films of Examples 1-15, Reference Examples 1-2, and Comparative Examples 1-6 was determined along with the following criteria:

A (especially good): exhibiting a residual gas rate of less than 1%;
B (good): exhibiting a residual gas rate of 1% or more to less than 20%;
C (slightly good): exhibiting a residual gas rate of 20% or more to less than 50%; and
D (poor): exhibiting a residual gas rate of 50% or more.

Germicidal Action

Three films for each of Examples 1-15, Reference Example 2, and Comparative Examples 1-6 were prepared, and subjected to the following test with N=3. The surface of each of the films was wiped and cleaned with BEMCOT ("Cupra long-fiber nonwoven fabric", manufactured by Asahi Kasei Corporation) absorbing ethanol. Then, a cell liquid containing $1\times10^6$ CFU/mL of *Staphylococcus aureus* (medium: 1/500 NB medium) was prepared. Then, 10 μL of the cell liquid was dropped on the surface of each of the films. Here, the surface of each of the films represents a surface of the synthetic polymer membrane side (any of the surfaces in the film of Reference Example 1, and the surface of a side supporting photocatalyst particles in the film of Reference Example 2). Then, each of the films are left to stand at room temperature (about 25° C.) in the atmosphere for 15 minutes. Then, SCDLP medium was put and left flowing on each of the films to wash out the cells. The washed-out SCDLP medium was appropriately diluted with PBS, followed by culture on a standard agar medium. On the basis of the number of colonies generated on the standard agar medium, the number of cells contained in the washed-out SCDLP medium (the number of viable cells) was counted. For the films of Examples 1-15, Reference Example 2, and Comparative Examples 1-6, the mean value of individual viable cell counts of the three films used for providing N=3 was calculated. This was defined as viable cell counts of the films of Examples 1-15, Reference Examples 1-2, and Comparative Examples 1-6.

The film of Reference Example 1 is a common PET film and thus is judged to have little germicidal action. Because of this, the film of Reference Example 1 was defined to have a cell viability (100×viable cell count/cell count in a pre-treatment cell liquid) of 100.0%. Then, on the basis of cell viability of the film of Reference Example 1, cell viability of each of the film (the films of Examples 1-15, Reference Example 2, and Comparative Examples 1-6) was calculated by the following formula.

Cell viability (%)=100×viable cell count in each film/viable cell count in the film of Reference Example 1

Germicidal action of the films of Examples 1-15, Reference Examples 1-2, and Comparative Examples 1-6 was judged along with the following criteria:

A (especially good): exhibiting a cell viability of 0.0%;
B (good): exhibiting a cell viability of more than 0.0% to 10.0% or less;
C (slightly good): exhibiting a cell viability of more than 10.0% to 50.0% or less; and
D (poor): exhibiting a cell viability of more than 50.0%.

Total Evaluation

Total evaluation was made on the films of Examples 1-15, Reference Examples 1-2, and Comparative Examples 1-6 along with the following criteria:

A (especially good): all ratings for abrasion resistance, deodorant action, and germicidal action are B or more (A or B);
B (good): all ratings for abrasion resistance, deodorant action, and germicidal action is C or more (A-C), and rating for at least one is C; and
C (poor): rating for at least one of abrasion resistance, deodorant action, and germicidal action is D.

TABLE 5

| | Physical property | | | Rating | | | | |
|---|---|---|---|---|---|---|---|---|
| | | | | Deodorant action | | Germicidal action | | |
| | Contact angle (°) | pH | Abrasion resistance | Residual gas rate (%) | Judgement | Cell viability (%) | Judgement | General rating |
| Example 1 | 41 | 6.9 | C | 2.3 | B | 15.4 | C | B |
| Example 2 | 21 | 6.8 | B | 6.4 | B | 3.6 | B | A |
| Example 3 | 18 | 6.8 | B | 6.8 | B | 6.2 | B | A |
| Example 4 | 14 | 6.6 | A | 23.4 | B | 17.3 | B | B |
| Example 5 | 29 | 6.9 | B | 18.5 | B | 9.4 | B | A |
| Example 6 | 30 | 6.9 | C | 31.5 | C | 28.6 | C | B |
| Example 7 | 18 | 6.9 | A | 42.1 | C | 40.9 | C | B |
| Example 8 | 18 | 6.9 | A | 18.9 | B | 37.6 | C | B |
| Example 9 | 24 | 6.6 | B | 3.7 | B | 4.2 | B | A |
| Example 10 | 25 | 6.6 | C | 0.0 | A | 2.3 | B | B |
| Example 11 | 21 | 4.5 | B | 9.4 | B | 0.0 | A | A |
| Example 12 | 22 | 4.2 | B | 6.4 | B | 0.0 | A | A |
| Example 13 | 52 | 6.2 | B | 7.4 | B | 21.5 | C | B |
| Example 14 | 15 | 4.7 | B | 2.4 | B | 6.3 | B | A |
| Example 15 | 17 | 8.2 | B | 32.5 | C | 38.6 | C | B |
| Reference Example 1 | 69 | 7.0 | A | 100.0 | D | 100.0 | D | C |
| Reference Example 2 | 61 | 6.8 | D | 0.0 | A | 28.4 | C | C |
| Comparative Example 1 | 54 | 6.9 | A | 100.0 | D | 96.5 | D | C |
| Comparative Example 2 | 53 | 6.9 | D | 2.1 | B | 22.1 | C | C |
| Comparative Example 3 | 17 | 6.9 | A | 100.0 | D | 92.8 | D | C |
| Comparative Example 4 | 18 | 4.1 | A | 100.0 | D | 5.3 | B | C |
| Comparative Example 5 | 16 | 6.8 | A | 100.0 | D | 92.3 | D | C |
| Comparative Example 6 | 19 | 6.6 | A | 95.8 | D | 87.6 | D | C |

The films of Examples 1-15 included a synthetic polymer membrane having a moth eye structure, and photocatalyst particles supported on the surface of the synthetic polymer membrane. As the synthetic polymer membrane was seen from a normal line direction, the two-dimensional size of the plurality of protrusions was more than 20 nm to less than 500 nm. The films of Examples 1-15 were excellent in abrasion resistance, deodorant action, and germicidal action.

By contrast, the films of Reference Example 1, Comparative Example 1, Comparative Example 3, and Comparative Example 4 included no photocatalyst particle. The films of Reference Example 1, Comparative Example 1, Comparative Example 3, and Comparative Example 4 thus have insufficiency in at least one of deodorant action and germicidal action.

The film of Reference Example 2 had photocatalyst particles supported on a flat surface of a PET film. The film of Comparative Example 2 had photocatalyst particles supported on a flat surface of a synthetic polymer membrane. The films of Reference Example 2 and Comparative Example 2 thus had insufficiency in abrasion resistance.

The films of Comparative Example 5 and Comparative Example 6 had photocatalyst particles added internally to a synthetic polymer membrane. The films of Comparative Example 5 and Comparative Example 6 thus had insufficiency in deodorant action and germicidal action.

INDUSTRIAL APPLICABILITY

The film according to an embodiment of the present invention can be used for a film or the like that coats a surface of a touch panel of an electronic instrument, a monitor, and an interactive whiteboard.

What is claimed is:
1. A film comprising:
    a synthetic polymer membrane comprising a surface having a plurality of protrusions; and
    photocatalyst particles supported on the surface of the synthetic polymer membrane,
    wherein a two-dimensional size of the plurality of protrusions, as the synthetic polymer membrane is seen from a normal line direction, is more than 20 nm and less than 500 nm, and
    the synthetic polymer membrane further comprises a surface adjuster including a glycerin fatty acid ester or an allylamine polymer.
2. The film according to claim 1, whether a mean particle diameter of the photocatalyst particles is 20 nm or more and 1000 nm or less.
3. The film according to claim 2, wherein the mean particle diameter of the photocatalyst particles is 20 nm or more and 35 nm or less.

4. The film according to claim 1, wherein the photocatalyst particles comprise a tungsten oxide.

5. The film according to claim 1, wherein, on the surface of the synthetic polymer membrane, a supported amount of the photocatalyst particles is 0.01 g/m² or more and 1.0 g/m² or less.

6. The film according to claim 1, wherein the synthetic polymer membrane further comprises an organic carboxylic acid.

7. The film according to claim 6,
wherein the synthetic polymer membrane is a cured material of a photocuring resin composition comprising a photopolymerization initiator, and
wherein the organic carboxylic acid is a photolyzed product of the photopolymerization initiator.

8. The film according to claim 7, wherein the photopolymerization initiator comprises a bis(2,4,6-trimethylbenzoyl)-phenylphosphine oxide.

9. The film according to claim 1,
wherein the synthetic polymer membrane comprises a synthetic polymer having a cross-linking structure, and
wherein the cross-linking structure comprises an ethylene oxide unit.

10. The film according to claim 1, wherein, in the film, a contact angle to water on the surface of a synthetic polymer membrane side is 40° or less.

11. The film according to claim 1, wherein, in the film, pH of an aqueous solution, recovered 5 minutes after dropping 200 μL of water on the surface of a synthetic polymer membrane side, is 7.0 or less.

\* \* \* \* \*